United States Patent
Kim et al.

(10) Patent No.: US 10,614,765 B2
(45) Date of Patent: Apr. 7, 2020

(54) DISPLAY DEVICE AND METHOD OF DRIVING THE DISPLAY DEVICE

(71) Applicant: Samsung Display Co., Ltd., Yongin-si, Gyeonggi-do (KR)

(72) Inventors: Ji Hye Kim, Yongin-si (KR); Dong Hwi Kim, Yongin-si (KR); Jin Jeon, Yongin-si (KR)

(73) Assignee: Samsung Display Co., Ltd., Yongin-si (KR)

(*) Notice: Subject to any disclaimer, the term of this patent is extended or adjusted under 35 U.S.C. 154(b) by 68 days.

(21) Appl. No.: 15/879,262

(22) Filed: Jan. 24, 2018

(65) Prior Publication Data
US 2018/0322831 A1 Nov. 8, 2018

(30) Foreign Application Priority Data
May 2, 2017 (KR) .................. 10-2017-0056555

(51) Int. Cl.
*G09G 3/3266* (2016.01)
*G09G 5/14* (2006.01)
(Continued)

(52) U.S. Cl.
CPC ......... *G09G 3/3266* (2013.01); *G09G 3/3233* (2013.01); *G09G 3/3258* (2013.01); *G09G 5/14* (2013.01); *G02B 27/017* (2013.01); *G09G 2300/0814* (2013.01); *G09G 2300/0819* (2013.01); *G09G 2300/0842* (2013.01); *G09G 2300/0861* (2013.01); *G09G 2300/0866* (2013.01); *G09G 2310/021* (2013.01); *G09G 2310/0213* (2013.01);
(Continued)

(58) Field of Classification Search
CPC ............ G09G 3/3266; G09G 2310/08; G09G 2320/08; G09G 2340/0442
See application file for complete search history.

(56) References Cited

U.S. PATENT DOCUMENTS 7,283,108 B2 * 10/2007 Kasai .................. G09G 3/3233
315/169.3
9,330,593 B2  5/2016 Jang
(Continued)

FOREIGN PATENT DOCUMENTS

KR  10-2014-0038148 A  3/2014

*Primary Examiner* — Nelson M Rosario
*Assistant Examiner* — Scott Au
(74) *Attorney, Agent, or Firm* — Lewis Roca Rothgerber Christie LLP

(57) ABSTRACT

A display device includes: first and second pixel regions, wherein the display device displays an effective image in the first and second pixel regions, corresponding to a first mode, and displays an effective image in the second pixel region, corresponding to a second mode; first pixels and first scan lines in the first pixel region; second pixels and second scan lines in the second pixel region; a first scan driver comprising first scan stages configured to drive at least some of the first scan lines; a second scan driver comprising second scan stages configured to drive the second scan lines; and a timing controller configured to supply first and second start signals to the first and second scan drivers, wherein, when the display device is driven in the second mode, a width of the second start signal is set wider than a width of the first start signal.

20 Claims, 17 Drawing Sheets

(51) Int. Cl.
  *G09G 3/3258* (2016.01)
  *G09G 3/3233* (2016.01)
  *G02B 27/01* (2006.01)

(52) U.S. Cl.
  CPC ............... *G09G 2310/0281* (2013.01); *G09G 2310/0286* (2013.01); *G09G 2310/08* (2013.01); *G09G 2320/0252* (2013.01); *G09G 2320/08* (2013.01); *G09G 2340/0442* (2013.01)

(56) References Cited

U.S. PATENT DOCUMENTS

| | | | |
|---|---|---|---|
| 2010/0079356 A1* | 4/2010 | Hoellwarth | G02B 27/017 345/8 |
| 2010/0134474 A1* | 6/2010 | Watanabe | G09G 3/3648 345/213 |
| 2016/0118023 A1* | 4/2016 | Park | G09G 3/20 345/204 |
| 2016/0225311 A1* | 8/2016 | Hwang | G09G 3/3208 |
| 2017/0270894 A1* | 9/2017 | Tang | G09G 3/2092 |

\* cited by examiner

DISPLAY DEVICE AND METHOD OF DRIVING THE DISPLAY DEVICE

CROSS-REFERENCE TO RELATED APPLICATION

This application claims priority to and the benefit of Korean Patent Application No. 10-2017-0056555, filed on May 2, 2017, in the Korean Intellectual Property Office, the entire disclosure of which is incorporated by reference herein.

BACKGROUND

1. Field

Aspects of some example embodiments of the present disclosure relate to a display device and a method of driving the display device.

2. Description of the Related Art

A display device includes a display region in which a plurality of pixels are provided. The display region is a region in which an image can be displayed using the pixels, and is also called as an active region.

A display device may support at least two display modes, and allow a region in which an effective image is displayed in the display region to be differently set according to the display modes. For example, the display device may display the effective image in the entire display region, corresponding to an entire display mode, and display the effective image in only a partial region previously set in the display region, corresponding to a partial display mode.

The above information disclosed in this Background section is only for enhancement of understanding of the background of the disclosure and therefore it may contain information that does not form prior art.

SUMMARY

Some example embodiments include a display device capable of supporting a plurality of display modes and improving image quality, and a method of driving the display device.

According to some example embodiments, a display device includes: first and second pixel regions, displays an effective image in the first and second pixel regions, corresponding to a first mode, and displays an effective image in the second pixel region, corresponding to a second mode, the display device including: a display region including the first and second pixel regions; first pixels and first scan lines, provided in the first pixel region; second pixels and second scan lines, provided in the second pixel region; a first scan driver including a plurality of first scan stages for driving at least some of the first scan lines; and a second scan driver including a plurality of second scan stages for driving the second scan lines, wherein the first scan driver supplies p (p is a natural number) first scan signals to each of the at least some of the first scan lines during one frame period, corresponding to the second mode, wherein the second driver supplies q (q is a natural number greater than p) second scan signals to each of the second scan lines during the one frame period, corresponding to the second mode.

The first scan driver may drive the at least some of the first scan lines during at least a partial period in the period in which the second scan lines are driven, corresponding to the second mode.

The first and second scan drivers may sequentially supply r (r is a natural number smaller than q) scan signals to each of the first and second scan lines, corresponding to the first mode.

The display device may further include a timing controller for supplying first and second start signals respectively to the first and second scan drivers, corresponding to first and second modes.

The timing controller may sequentially supply the first and second start signals respectively to the first and second scan drivers, corresponding to the first mode. When the display device is driven in the first mode, the first and second start signals may have the same width.

The timing controller may supply the first and second start signals having different width respectively to the first and second scan drivers, corresponding to the second mode. When the display device is driven in the second mode, the second start signal may have a width wider by two horizontal periods (2H) or more than that of the first start signal.

The display device may further include: a third pixel region provided in the display region; third pixels and third scan lines, provided in the third pixel region; and a third scan driver including a plurality of third scan stages for driving the third scan lines. The timing controller may supply a third start signal having a width narrower by two horizontal periods (2H) or more than that of the second start signal, corresponding to the second mode.

The timing controller may sequentially supply the first, second, and third start signals respectively to the first, second, and third scan drivers, corresponding to the first mode. When the display device is driven in the first mode, the first, second, and third start signals may have the same width.

When the display device is driven in the second mode, the first and third start signals may be supplied during period different from one another in the period in which the second scan lines are driven, and have the same width.

The display device may further include: a third pixel region provided in the display region; third pixels and third scan lines, provided in the third pixel region; and a third scan driver including a plurality of third scan stages for driving the third scan lines. The first and third scan drivers may respectively drive the first and third scan lines during different partial periods in the period in which the second scan lines are driven, corresponding to the second mode.

The second pixel region may be provided between the first pixel region and the third pixel region.

When the display device is driven in the second mode, the second scan driver may sequentially drive the second scan lines during the one frame period, the first scan driver may sequentially drive the first scan lines during the period in which some second scan lines adjacent to the third pixel region among the second scan lines are driven, and the third scan driver may sequentially drive the third scan lines during the period in which other second scan lines adjacent to the first pixel region among the second scan lines are driven.

The first, second, and third scan drivers may sequentially drive the respective first, second, and third scan lines, corresponding to the first mode.

Second pixels provided on a first horizontal line of the second pixel region may be coupled to any one scan line among the first scan lines.

The second scan driver may further include a first scan stage for driving the one first scan line, and sequentially supply q first scan signals and the q second scan signals respectively to the one first scan line and the second scan lines by sequentially shifting a second start signal supplied to the first scan stage.

When the display device is driven in the second mode, each of the first pixels may emit light during a first time in the one frame period, and each of the second pixels may emit light during a second time longer than the first time in the one frame period.

The display device may further include: first emission control lines provided in the first pixel region; second emission control lines provided in the second pixel region; a first emission control driver including a plurality of first emission control stages for driving the first emission control lines; a second emission control driver including a plurality of second emission control stages for driving the second emission control lines; and a timing controller for supplying first and second emission start signals respectively to the first and second emission control drivers, corresponding to the first and second modes. When the display device is driven in the first mode, the first and second emission start signals may have the same width. When the display device is driven in the second mode, the first and second emission start signals may have widths different from each other.

According to an aspect of the present disclosure, there is provided a display device that includes first and second pixel regions, displays an effective image in the first and second pixel regions, corresponding to a first mode, and displays an effective image in the second pixel region, corresponding to a second mode, the display device including: a display region including the first and second pixel regions; first pixels and first scan lines, provided in the first pixel region; second pixels and second scan lines, provided in the second pixel region; a first scan driver including a plurality of first scan stages for driving at least some of the first scan lines; a second scan driver including a plurality of second scan stages for driving the second scan lines; and a timing controller for supplying first and second start signals respectively to the first and second scan drivers, wherein, when the display device is driven in the second mode, a width of the second start signal is set wider than that of the first start signal.

According to an aspect of the present disclosure, there is provided a method for driving a display device including a first pixel region in which first pixels are provided and a second pixel region in which second pixels are provided, the method including: when the display device is driven in a first mode, displaying an effective image in the first and second pixel regions; and when the display device is driven in a second mode, displaying an effective image in the second pixel region, wherein, when the display device is driven in the first mode, the same number of scan signals are supplied to each of the first and second pixels during each frame period, wherein, when the display device is driven in the second mode, q (q is a natural number of 2 or more) second scan signals are supplied to each of the second pixels during one frame period, and p (p is a natural number smaller than q) first scan signals are supplied to each of at least some of the first pixels during the period in which the second scan signal is supplied to at least some of the second pixels.

When the display device is driven in the first mode, each of the first and second pixels may be controlled to have the same emission time. When the display device is driven in the second mode, each of the first pixels may be controlled to have an emission time shorter than that of each of the second pixels.

BRIEF DESCRIPTION OF THE DRAWINGS

Aspects of some example embodiments will now be described more fully hereinafter with reference to the accompanying drawings; however, aspects of the invention may be embodied in different forms and should not be construed as limited to the embodiments set forth herein. Rather, these embodiments are provided so that this disclosure will be more thorough and more complete, and will more fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

Figure 1A:
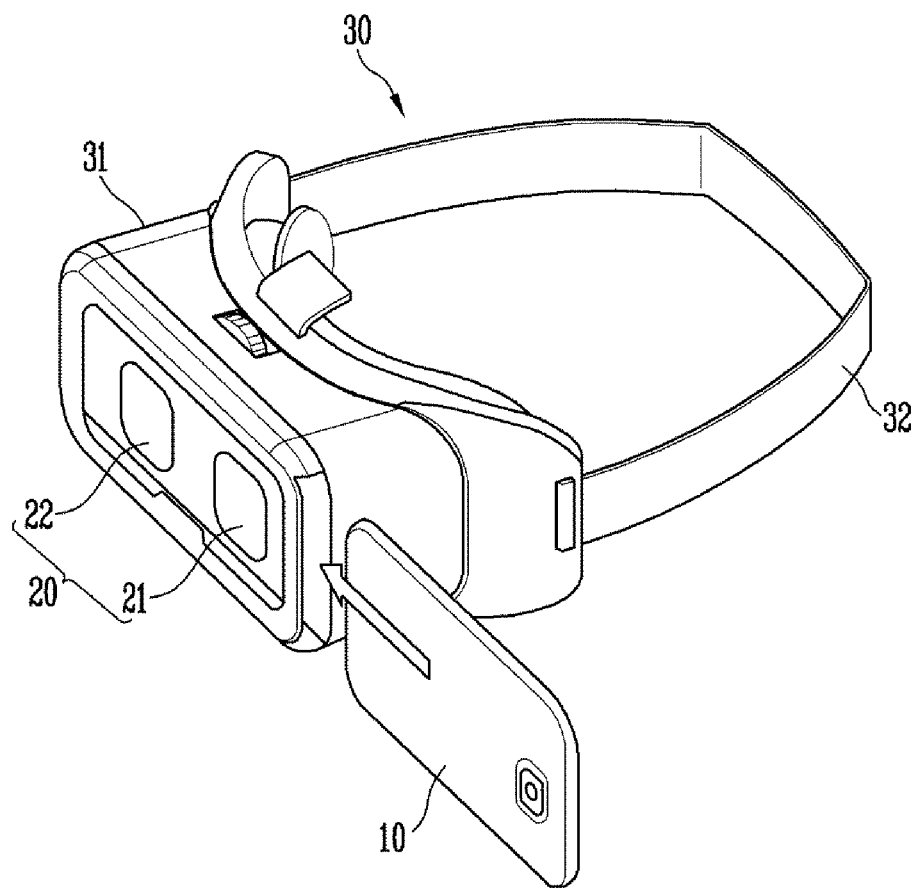
FIGS. 1A to 1C illustrate an example wearable electronic device and a state in which a display device is mounted in the wearable electronic device according to some example embodiments of the present disclosure.

Hereinafter, aspects of some example embodiments of the present disclosure will be described in more detail with reference to the accompanying drawings. However, the present disclosure is not limited to the embodiments but may be implemented into different forms. These embodiments are provided only for illustrative purposes and for full understanding of the scope of the present disclosure by those skilled in the art. In the entire specification, when an element is referred to as being "connected" or "coupled" to another element, it can be directly connected or coupled to the another element or be indirectly connected or coupled to the another element with one or more intervening elements interposed therebetween.

Meanwhile, in the following embodiments and the attached drawings, elements not directly related to the present disclosure are omitted from depiction, and dimensional relationships among individual elements in the attached drawings are illustrated only for ease of understanding but not to limit the actual scale. It should note that in giving reference numerals to elements of each drawing, like reference numerals refer to like elements even though like elements are shown in different drawings.

A display device according to an embodiment of the present disclosure may support a plurality of display modes (or driving modes) including first and second modes, and display an effective image in different regions, corresponding to the first and second modes. For example, the display device may display the effective image in the entire display region, corresponding to the first mode, and display the effective image in only a partial region within the entire display region, corresponding to the second mode.

In addition, a display device according to an embodiment of the present disclosure may be mounted and used in a wearable electronic device. When the display device is mounted in the wearable electronic device, the display device may be driven in the second mode. A wearable electronic device will be first described, and then a display device and a method of driving the display device according to an embodiment of the present disclosure will be described in more detail. However, the display device according to example embodiments of the present disclosure may not be necessarily driven in a specific mode (e.g., the second mode) only when the display device is mounted in the wearable electronic device. For example, the display device may be driven in a predetermined mode according to another use environment or a selection of a user.

Figure 1B:
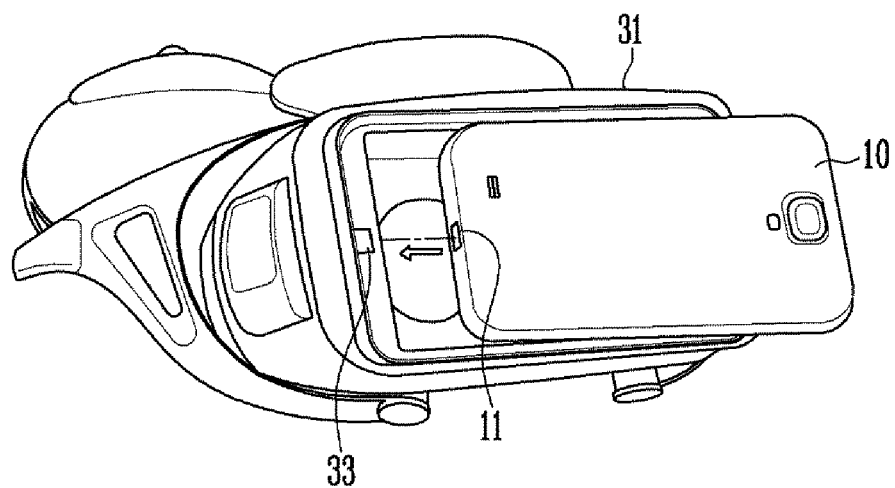
Figure 1C:
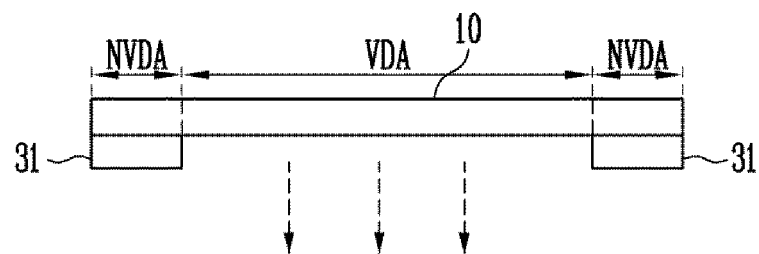

FIGS. 1A to 1C illustrate an example wearable electronic device and a state in which a display device is mounted in the wearable electronic device according to an example embodiment of the present disclosure. In FIGS. 1A to 1C, a head mounted display device (hereinafter, referred to as an "HMD") is illustrated as an example of the wearable electronic device, but the wearable electronic device according to the present disclosure is not limited thereto.

Referring to FIGS. 1A and 1B, the wearable electronic device 30 according to some example embodiments of the present disclosure may include a frame 31.

A band 32 may be coupled to the frame 31, and a user may wear the frame 31 on a head thereof by using the band 32. The frame 31 has a structure in which a display device 10 can be detachably mounted thereto.

In some embodiments, the display device 10 capable of being mounted in the wearable electronic device 30 may be a smart phone, but the present disclosure is not limited thereto. For example, in addition to the smart phone, the display device 10 may be any one of electronic devices that is capable of being mounted in the wearable electronic device 30 and has a display means, such as a tablet PC, an electronic book reader, a personal digital assistant (PDA), a portable multimedia player (PMP), and a camera.

In some embodiments, when the display device 10 is mounted to the frame 31, a connecting part (or connector) 11 of the display device 10 and a connecting part (or connector) 33 of the frame 31 may be electrically coupled to each other. Accordingly, communication between the wearable electronic device 30 and the display device 10 may be performed. In order to control the display device 10 mounted to the frame 31, the wearable electronic device 30 may include at least one of a touch sensor, a button, and a wheel key.

If the display device 10 is mounted in the wearable electronic device 30, the display device 10 may operate as the HMD. For example, when the display device 10 is separated from the wearable electronic device 30, the display device 10 may be driven in a first mode. When the display device 10 is mounted in the wearable electronic device 30, the display device 10 may be driven in a second mode in which an effective image is displayed in a region different from that in the first mode. In some embodiments, the first mode may be an entire display mode in which an image is displayed in the entire display region of the display device 10, e.g., a normal mode. In addition, the second mode may be a partial display mode in which an image is displayed in only a partial display region of the display device 10, e.g., a virtual reality mode (VR mode).

In some embodiments, in the second mode, an effective image may be displayed, using only the remaining display region except a partial display region within the entire display region, according to a screen ratio optimized to an image or content to be displayed. For example, in the second mode, the remaining display region except a partial display region within the entire display region may be set as an effective display region according to a screen ratio of 16:9, which is optimized when a three-dimensional image (3D image) is implemented, and an effective image to be actually displayed may be displayed in only the effective display region.

For example, in the second mode, the remaining display region except 200 pixel columns (e.g., 200 horizontal lines) arranged in each of top and bottom (or left and right) edge regions of the entire display region may be set as an effective display region, and an effective image may be displayed in only the effective display region.

In some embodiments, the display mode of the display device 10 may be changed automatically or manually. For example, if the display device 10 is mounted in the wearable electronic device 30, the display mode of the display device 10 may be automatically changed to the second mode or be changed to the second mode according to a setting of the user. Meanwhile, if the display device 10 is separated from the wearable electronic device 30, the display mode of the display device 10 may be automatically changed to the first mode or be changed to the first mode according to a setting of the user.

In some embodiments, the wearable electronic device 30 may include lenses 20 corresponding to two eyes of the user. For example, the wearable electronic device 30 may include a left-eye lens 21 and a right-eye lens 22, which respectively correspond to left and right eyes of the user. Meanwhile, the present disclosure is not limited to the wearable electronic device 30 including the left-eye lens 21 and the right-eye lens 22. For example, in another embodiment of the present disclosure, the wearable electronic device 30 may include one integrated lens 20 such that the same image can be viewed with the left and right eyes. In some embodiments, the lens 20 may be a fisheye lens, a wide-angle lens, or the like so as to increase the field of view (FOV) of the user, but the present disclosure is not limited thereto.

If the display device 10 is fixed to the frame 31, the user views an image displayed in the display device 10 through the lens 20. Accordingly, it is possible to provide an effect as if the user views images displayed on a large-sized screen located at a certain distance therefrom.

Referring to FIG. 1C, when the display device 10 is mounted and used in the wearable electronic device 30, a partial region of the display device 10 may be blocked by the frame 31. For example, when the display device 10 is mounted in the wearable electronic device 30, a portion of the entire display region of the display device 10 may be covered by the frame 31.

For example, in the state in which the display device 10 is mounted in the wearable electronic device 30, a predetermined central portion including a region viewed by the user through the lens 20 of the wearable electronic device 30 in the entire display region of the display device 10 may become a visible region VDA (or effective display region). In addition, the remaining display region of the display device 10, e.g., an outer display region may become a non-visible region NVDA (or a non-effective display region) covered by the frame 31.

Meanwhile, in some embodiments, the central portion of the display device 10 may also be divided into a visible region VDA and a non-visible region NVDA such as a more vivid image can be displayed to the user. For example, a region corresponding to each of the left-eye lens 21 and the right-eye lens 22 at the central portion of the display device 10 may be set to the visible region VDA, and the remaining region may be set to the non-visible region NVDA. In this case, an image displayed in the visible region VDA is controlled corresponding to each of the left-eye lens 21 and the right-eye lens 22, thereby displaying, for example, a 3D image.

When the display device 10 is mounted in the wearable electronic device 30 to be driven in the second mode, an effective image may be displayed in the visible region VDA at the central portion of the display device 10. In addition, any image may not be displayed in the non-visible region NVDA, or a black or dummy image may be displayed in the non-visible region NVDA.

Meanwhile, when the display device 10 is separated from the wearable electronic device 30 to be driven in the first mode, the entire display region of the display device 10 may be viewed by the user. That is, if the display device 10 is separated from the wearable electronic device 30, the entire display region may become the visible region VDA. In this case, the display device 10 may be driven in the first mode, to display an effective image in the entire display region. The display device 10 according to the embodiment of the present disclosure may be driven in different manners by the first and second modes different from each other.

In an embodiment of the present disclosure, when the display device 10 is used together with the wearable electronic device 30, various types of images may be displayed. For example, when the display device 10 is mounted in the wearable electronic device 30 to be driven in the second mode, the display device 10 may display a left-eye image and a right-eye image in display regions corresponding to the respective left-eye and right-eye lenses 21 and 22 by driving the display device 10 at a high speed (i.e., a high frequency) as compared with the first mode, so that a 3D image can be displayed.

The wearable electronic device 30 can provide high-degree immersion by displaying a realistic image. Accordingly, the wearable electronic device 30 such as an HMD is used in various usages including movie appreciation.

However, because the region in which an effective image is displayed when the display device 10 is driven in the first mode and the region in which an effective image is displayed when the display device 10 is driven in the second mode are different from each other, a boundary line between the visible region VDA and the non-visible region NVDA may be viewed when the display mode of the display device 10 is changed.

For example, in a comparative example, it is assumed that the driving of the non-visible region NVDA is stopped so as to secure a scan time necessary for high-speed driving during a period in which the display device 10 is driven in the second mode. In the comparative example, the boundary line between the visible region VDA and the non-visible region NVDA may be viewed when the display mode of the display device 10 is changed to the first mode. For example, when the supply of a scan signal to the non-visible region NVDA located at both ends of the visible region VDA is stopped and pixels of the non-visible region NVDA are maintained in an off-state during the period in which the display device 10 is driven in the second mode, the hysteresis of driving transistors provided in pixels of the visible region VDA may be different from that of driving transistors provided in the pixels of the non-visible region NVDA. Therefore, if the display mode of the display device 10 is changed to the first mode to be driven after the display device 10 is driven in the second mode during a certain period, there may occur a variation in luminance and/or response speed between the region that has been driven as the visible region VDA during the period in which the display device 10 is driven in the second mode and the region of which driving has been stopped as the non-visible region NVDA. Therefore, a boundary line or a block-shaped spot may be viewed inside the display region.

Accordingly, in an embodiment of the present disclosure, which will be described later, there are proposed a display device capable of preventing (or reducing) the occurrence of a characteristic difference between a plurality of regions constituting a display region and preventing or minimizing or reducing the occurrence of image sticking or light leakage interference at boundaries between the regions, and a method of driving the display device. Also, in an embodiment of the present disclosure, there are proposed a display device capable of securing a scan time sufficient enough to prevent (or reduce) image quality from being deteriorated even in high-speed driving and improving the response speed of pixels, and a method of driving the display device.

Figure 2:
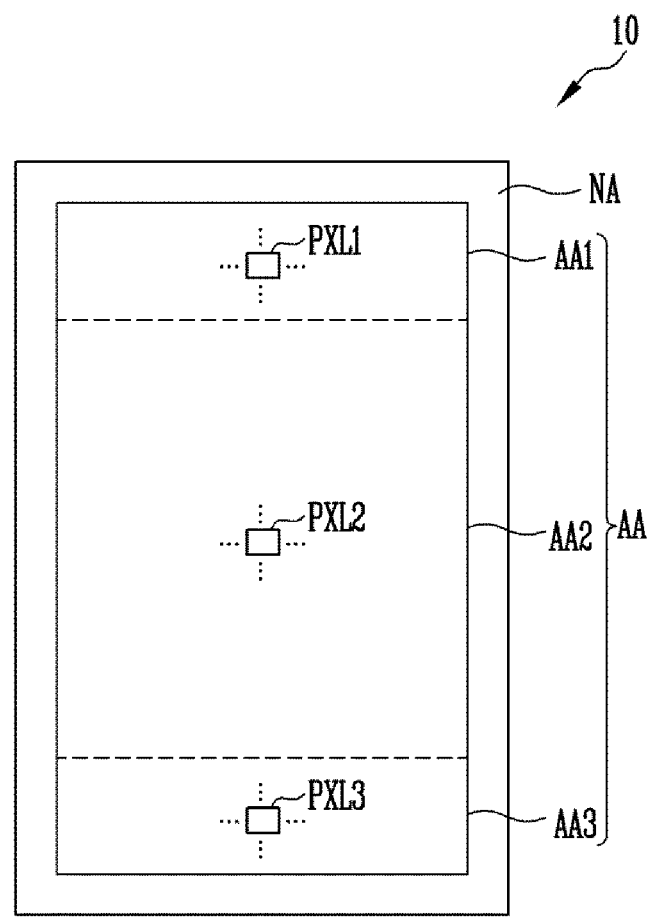
FIG. 2 schematically illustrates a display device according to some example embodiments of the present disclosure.

FIG. 2 schematically illustrates a display device according to an embodiment of the present disclosure.

Referring to FIG. 2, the display device 10 according to the embodiment of the present disclosure includes a display region AA and a peripheral region NA. In some embodiments, the display region AA may be an active region in which a plurality of pixels PXL1, PXL2, and PXL3 are provided to display an image. In addition, the peripheral region NA may be the remaining region except the display region AA, i.e., a non-display region at the periphery of the display region AA.

The display region AA may include at least two pixel regions AA1, AA2, and AA3. For example, the display region AA may include at least first and second pixel regions AA1 and AA2. In some embodiments, the display region AA may additionally include a third pixel region AA3. Hereinafter, for convenience, it is assumed that the display region AA is configured with first to third pixel regions AA1, AA2, and AA3 which are sequentially arranged.

In some embodiments, the first, second, and third pixel regions AA1, AA2, and AA3 may be arranged adjacent to each other. For example, the first, second, and third pixel regions AA1, AA2, and AA3 may be arranged consecutively adjacent to each other from one side of the display device 10. A plurality of pixels PXL1, PXL2, and PXL3 may be provided in the first, second, and third pixel regions AA1, AA2, and AA3, respectively. Thus, an image can be displayed in the display region AA by using the pixels PXL1, PXL2, and PXL3.

In some embodiments, the first pixel region AA1 may be located at one side of the second pixel region AA2, and the third pixel region AA3 may be located at the other side of the second pixel region AA2. That is, in some embodiments, the second pixel region AA2 may be provided between the first pixel region AA1 and the third pixel region AA3.

In some embodiments, at least two of the pixel regions AA1, AA2, and AA3 may have different regions. For example, the area of the second pixel region AA2 may be larger than the first pixel region AA1 and/or the third pixel region AA3. In an embodiment, the second region AA2 may have the largest area, and the first pixel region AA1 and the third pixel region AA3 may have the same area. However, the present disclosure is not limited thereto. For example, in another embodiment, the pixel regions AA1, AA2, and AA3 may be set to have the same area.

In some embodiments, a case where the first pixel region AA1, the second pixel region AA2, and the third pixel region AA3 have the same width is illustrated in FIG. 2, but the present disclosure is not limited thereto. For example, the first pixel region AA1 and/or the third pixel region AA3 may have a shape of which width becomes narrower as becoming more distant from the second pixel region AA2. Alternatively, the first pixel region AA1 and/or the third pixel region AA3 may have a certain width that is narrower than that of the second pixel region AA2.

Additionally, in some embodiments, at least two of the pixel regions AA1, AA2, and AA3 may have the same width and/or length, or have the same number of horizontal lines (horizontal pixels) that have different areas. For example, the first pixel region AA1 and/or the third pixel region AA3 may have the same width and/or length and the same number of horizontal lines of which areas are different. In an embodiment, although the first pixel region AA1 and the third pixel region AA3 include the same number of horizontal lines while having the substantially same width and length, if a concave portion, an opening, a dummy region (i.e., a region in which the first pixels PXL1 are not provided), or the like is arranged in one region of the first pixel region AA1, the area of the first pixel region AA1 may be smaller than that of the third pixel region AA3. That is, in the present disclosure, the shapes, sizes (e.g., the width, length, and/or area), and position of the first pixel region AA1, the second pixel region AA2, and/or the third pixel region AA3 are not particularly limited, and may be variously modified and implemented.

In some embodiments, the second pixel region AA2 located at a central portion of the display region AA may correspond to the visible region VDA shown in FIG. 1C. In addition, the first pixel region AA1 and the third pixel region AA3, which are located at an edge of the display region AA, may correspond to the non-visible region NVDA shown in FIG. 1C.

For example, when the display device 10 is driven in the second mode, the user cannot view an image displayed in the first pixel region AA1 and the third pixel region AA3, and can view only an image displayed in the second pixel region AA2. In this case, the display device 10 may display an effective image in only the second pixel region AA2.

In some embodiments, when the display device 10 is driven in the second mode, the first and third pixel regions AA1 and AA3 may display a predetermined dummy image. Also, in some embodiments, the luminance of the dummy image may be controlled to be low to an extent where it is difficult to recognize the luminance with eyes of the user. This will be described in detail later.

Meanwhile, when the display device 10 is driven in the first mode, the user can view an image displayed in the first to third pixel regions AA1, AA2, and AA3. That is, when the display device 10 is driven in the first mode, an effective image can be displayed in the entire display region AA. For example, when the display device 10 is driven in the first mode, one screen may be implemented in the entire display region AA by connecting images displayed in the first to third pixel regions AA1, AA2, and AA3.

In some embodiments, a plurality of first pixels PXL1 may be provided in the first pixel region AA1, and a plurality of second pixels PXL2 may be provided in the second pixel region AA2. In addition, a plurality of third pixels PXL3 may be provided in the third pixel region AA3.

The pixels PXL1, PXL2, and PXL3 emit light with a predetermined luminance, corresponding to various driving power sources and driving signals supplied from a driving circuit. To this end, each of the pixels PXL1, PXL2, and PXL3 may include at least one light emitting device (e.g., an organic light emitting diode).

The peripheral region NA is a non-display region in which any image is not displayed, and components for driving the pixels PXL1, PXL2, and PXL3 may be arranged in the peripheral region NA. For example, lines, pads, and/or at least one driving circuit may be located in the peripheral region NA.

In some embodiments, the peripheral region NA may be arranged at the periphery of the display region AA to surround at least a portion of the display region AA. For example, the peripheral region NA may be arranged to entirely surround the display region AA.

Figure 3:
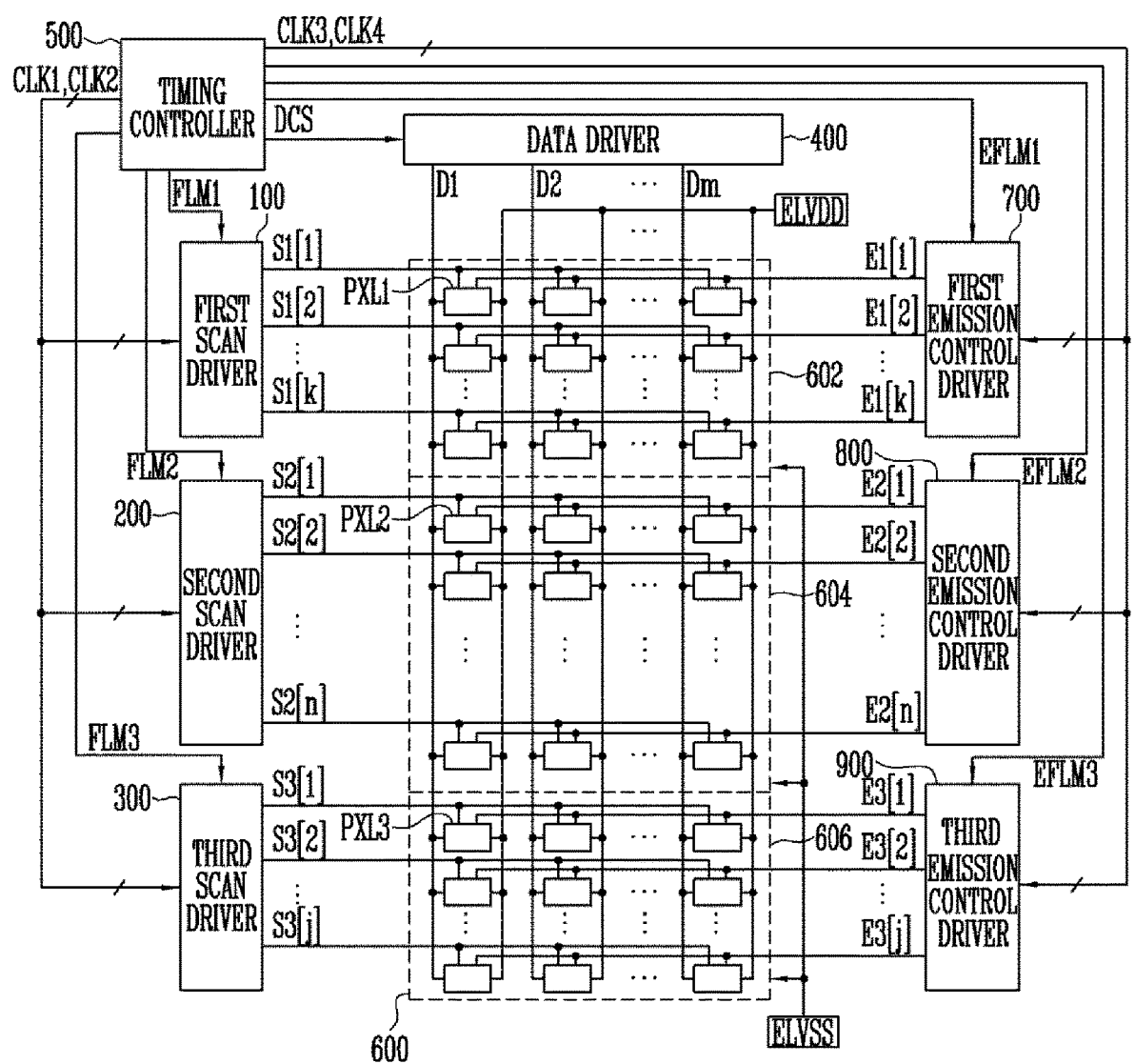
FIG. 3 illustrates a display device according to some example embodiments of the present disclosure.

FIG. 3 illustrates a display device according to an embodiment of the present disclosure. In some embodiments, the display device shown in FIG. 3 may be a display device that includes at least first and second pixel regions to support a plurality of display modes as shown in FIGS. 1A to 2. For example, the display device may display an effective image in the entire display region, corresponding to the first mode, and display an effective image in only the second pixel region, corresponding to the second mode. Also, in some embodiments, the display device may be a display device that is detachably mounted in a wearable electronic device. For example, the display device may be driven in the second mode when the display device is mounted in the wearable electronic device, and be driven in the first mode when the display device is separated from the wearable electronic device.

Referring to FIG. 3, the display device according to the embodiment of the present disclosure includes a first scan driver 100, a second scan driver 200, a third scan driver 300, a data driver 400, a timing controller 500, and a display region 600. In the embodiment of the present disclosure, the scan drivers 100, 200, and 300 may be provided corresponding to the number of pixel regions 602, 604, and 660 that constitute the display region 600.

In addition, the display device according to the embodiment of the present disclosure may further include a plurality of emission control drivers 700, 800, and 900 for independently controlling emission times of the pixel regions 602, 604, and 606. For example, the emission control drivers 700, 800, and 900 may be provided corresponding to the number of pixel regions 602, 604, and 606. However, the emission control drivers 700, 800, and 900 may be omitted according to the structure of pixels PXL1, PXL2, and PXL3. Alternatively, the emission control drivers 700, 800, and 900 may be integrally implemented with the scan drivers 100, 200, and 300.

In some embodiments, the display region 600 includes at least two pixel regions 602, 604, and 606 that can be independently driven. For example, the display region 600 may include a first pixel region 602 driven by the first scan driver 100, a second pixel region 604 driven by the second scan driver 200, and a third pixel region 606 driven by the third scan driver 300.

A plurality of first pixels PXL1 and a plurality of first scan lines S1[1] to S1[$k$] ($k$ is a natural number of 2 or more) are provided in the first pixel region 602. The first pixels PXL1 are coupled to the first scan lines S1[1] to S1[$k$] and data lines D1 to Dm.

In some embodiments, the first scan lines S1[1] to S1[$k$] may be provided in the first pixel region 602 to extend along a first direction, e.g., a horizontal direction (row direction). In some embodiments, the data lines D1 to Dm may be provided in the display region 600 to intersect first to third scan lines S1[1] to S1[$k$], S2[1] to S2[$n$], and S3[1] to S3[$j$] along a second direction intersecting the first scan lines S1[1] to S1[$k$], e.g., a vertical direction (column direction).

The first pixels PXL1 are selected when a first scan signal is supplied to the first scan lines S1[1] to S1[$k$] to be supplied with a data signal from the data lines D1 to Dm. Each of the first pixels PXL1 supplied with the data signal emits light with a luminance corresponding to the data signal while controlling the driving current flowing a first power source ELVDD to a second power source ELVSS via an organic light emitting diode (not shown).

A plurality of second pixels PXL2 and a plurality of second scan lines S2[1] to S2[$n$] ($n$ is a natural number of 2 or more) are provided in the second pixel region 604. The second pixels PXL2 are coupled to the second scan lines S2[1] to S2[$n$] and the data lines D1 to Dm. In some embodiments, the second scan lines S2[1] to S2[$n$] may be provided in the second pixel region 604 to extend in the first direction, e.g., the horizontal direction, and intersect the data lines D1 to Dm. In some embodiments, the number of second scan lines S2[1] to S2[$n$] arranged in the second pixel region 604 may be equal to or greater than that of first scan lines S1[1] to S1[$k$] and/or third scan lines S3[1] to S3[$j$], which are arranged in the first pixel region 602 and/or the third pixel region 606, but the present disclosure is not limited thereto.

The second pixels PXL2 are selected when a second scan signal is supplied to the second scan lines S2[1] to S2[$n$] to be supplied with a data signal from the data lines D1 to Dm. Each of the second pixels PXL2 supplied with the data signal emits light with a luminance corresponding to the data signal while controlling the driving current flowing the first power source ELVDD to the second power source ELVSS via an organic light emitting diode (not shown).

A plurality of third pixels PXL3 and a plurality of third scan lines S3[1] to S3[$j$] ($j$ is a natural number of 2 or more) are provided in the third pixel region 606. The third pixels PXL3 are coupled to the third scan lines S3[1] to S3[$j$] and the data lines D1 to Dm. In some embodiments, the third scan lines S3[1] to S3[$j$] may be provided in the third pixel region 606 to extend along the first direction, e.g., the horizontal direction, and intersect the data lines D1 to Dm.

The third pixels PXL3 are selected when a third scan signal is supplied to the third scan lines S3[1] to S3[$j$] to be supplied with a data signal from the data lines D1 to Dm. Each of the third pixels PXL3 supplied with the data signal emits light with a luminance corresponding to the data signal while controlling the driving current flowing the first power source ELVDD to the second power source ELVSS via an organic light emitting diode (not shown).

Meanwhile, in an embodiment of the present disclosure, the first to third pixels PXL1, PXL2, and PXL3 may be implemented with various types of circuits currently known in the art. For example, the first to third pixels PXL1, PXL2, and PXL3 may include various pixel circuits each including a driving transistor (not shown).

Additionally, the number of first scan lines S1[1] to S1[$k$], second scan lines S2[1] to S2[$n$], and/or third scan lines S3[1] to S3[$j$], which are respectively arranged in the first, second, and third pixel regions 602, 604, and 606 may be variously changed.

For example, the number of first scan lines S1[1] to S1[$k$] may be set to at least two by considering a region overlapping with the frame 31 of the wearable electronic device 30 and/or a screen ratio when the display device is driven in the second mode. In an embodiment, 100 or more first scan lines S1[1] to S1[$k$] may be arranged in the first pixel region 602. Similarly, the number of third scan lines S3[1] to S3[$j$] may be set to at least two by considering a region overlapping with the frame 31 of the wearable electronic device 30 and/or a screen ratio when the display device is driven in the second mode. In an embodiment, 100 or more third scan lines S3[1] to S3[$j$] may be arranged in the third pixel region 606.

In some embodiments, the first pixel region 602, the second pixel region 604, and the third pixel region 606 may be arranged consecutively adjacent to each other. For example, the pixel regions 602, 604, and 606 may be sequentially arranged in an order of the first pixel region 602, the second pixel region 604, and the third pixel region 606 from one side (e.g., an upper end) of the display region 600. In this case, the second pixel region 604 may be provided in a central region of the display region 600. In addition, the first pixel region 602 may be located adjacent to the first horizontal line (first horizontal pixel column) of the second pixel region 604, and the third pixel region 606 may be located adjacent to the last horizontal line (last horizontal pixel column) of the second pixel region 604. Therefore, a first second scan line S2[1] among the second scan lines S2[1] to S2[$n$] may be arranged adjacent to the last first scan line S1[$k$], and the last second scan line S2[$n$] may be arranged adjacent to a first third scan line S3[1].

In an embodiment of the present disclosure, the display region 600 may display an effective image in the entire display region 600 including the first to third pixel regions 602, 604 and 606 corresponding to the first mode. That is, when the display device is driven in the first mode, a predetermined effective image may be displayed in the entire display region 600, and the user may see all of the images displayed in the first to third pixel regions 602, 604 and 606.

On the other hand, the display region 600 may display an effective image only in a part of the display region 600 corresponding to the second mode. For example, when the display device is driven in the second mode, a predetermined effective image may be displayed in the second pixel region 604. In this case, images may not be displayed in the first and third pixel regions 602 and 606, or a dummy image may be displayed in the first and third pixel regions 602 and 606.

For example, in an embodiment of the present disclosure, when the display device is driven in the second mode, a dummy image may be displayed in the first and third pixel regions 602 and 606. In some embodiments, the dummy image may be a portion of an effective image displayed in the second pixel region 604. Also, the luminance of the dummy image may be set lower than that of the effective image. For example, the luminance of the dummy image may be a luminance close to black to an extent where it is difficult to recognize the luminance with the eyes of the user.

Meanwhile, in a comparative example, the driving of the first and third pixel regions 602 and 605 may be stopped during a period in which the display device is driven in the second mode. For example, during the period in which the display device is driven in the second mode, the driving of the first and third scan drivers 100 and 300 may be stopped, and any data signal may not be supplied to the first and third pixels PXL1 and PXL3. In this case, one frame period may be divided into horizontal periods of which number corresponds to that of second scan lines S2[1] to S2[n] without allocating a certain period in each frame period to the driving of the first and third scan lines S1[1] to S1[k] and S3[1] to S3[j]. That is, in the second mode, the number of horizontal periods constituting one frame period may decrease as compared with the first mode. Accordingly, one horizontal period 1H can be secured to an extent where the deterioration of image quality can be prevented (or reduced) even when the second scan lines S2[1] to S2[n] are driven at a high speed using a frequency (e.g., 75 Hz) higher than a driving frequency (e.g., 60 Hz) in the first mode so as to implement a 3D image. Thus, when the display device is driven in the second mode, the driving time of the second scan lines S2[1] to S2[n] can be secured even when the second pixel region 604 is driven at a high speed.

However, if any data signal is not supplied to the first and third pixels PXL1 and PXL3, corresponding to a specific mode (e.g., the second mode), a characteristic difference (e.g., a TFT characteristic difference caused by a bias) may occur between driving transistors included in the first and third pixels PXL1 and PXL3 and driving transistors included in the second pixels PXL2. Accordingly, when the display mode of the display device is changed from the second mode to the first mode, a luminance difference and/or a response speed difference may occur for each of the pixel regions 602, 604, and 606. Therefore, image sticking may occur in the first pixel region 602 and/or the third pixel region 606, or a block-shaped spot may be viewed by the user in the display region 600 as boundary lines between the pixels regions 602, 604, and 606 are viewed.

On the other hand, in the embodiment of the present disclosure, the first and third pixel regions 602 and 606 are driven to display a predetermined image (e.g., a dummy image) even when the display device is driven in the second mode. Accordingly, it is possible to prevent (or reduce) the occurrence of a characteristic difference of the pixels PXL1, PXL2, and PXL3 between the pixel regions 602, 604, and 606, thereby improving the image quality of the display device.

In an embodiment of the present disclosure, when an effective image is displayed in only the second pixel region 604 as the display device is driven in the second mode, the first and third scan lines S1[1] to S1[k] and S3[1] to S3[j] are driven during a partial period in the period in which the first and third scan lines S1[1] to S1[k] and S3[1] to S3[j] are driven. That is, in some embodiments, each of the first and third scan lines S1[1] to S1[k] and S3[1] to S3[j] may be simultaneously (e.g., concurrently) driven with any one of the second scan lines S2[1] to S2[n].

In this case, the first and third pixels PXL1 and PXL3 may be supplied with a portion of the data signal input to the second pixels PXL2. Here, in some embodiments, the first and third pixels PXL1 and PXL3 may be covered by the frame 31, or be controlled to emit light for only a very short time. Accordingly, the dummy image displayed in the first and third pixel regions 602 and 606 can be prevented from being actually recognized by the user, or the occurrence of light leakage caused by the first and third pixel regions 602 and 606 can be prevented (or reduced).

As described above, in the embodiment of the present disclosure, when the display device is driven in the second mode, the first and third scan lines S1[1] to S1[k] and S3[1] to S3[j] are driven during at least a partial period in the period in which the second scan line S2[1] to S2[n] in the effective display region are driven. Accordingly, the time necessary for high-speed driving of the second pixel region 604 can be sufficiently secured, and the occurrence of a characteristic difference between the pixel regions 602, 604, and 606 can be prevented (or reduced), thereby improving the image quality of the display device.

To this end, in an embodiment of the present disclosure, the display device is designed such that the pixel regions 602, 604, and 606 can be independently driven. For example, the display device according to the present disclosure includes a plurality of scan drivers 100, 200, and 300 for driving the respective pixel regions 602, 604, and 606, and independently supplies start signals FLM1, FLM2, and FLM3 to the respective scan drivers 100, 200, and 300. According to the embodiment of the present disclosure, only two start signals (e.g., second and third start signals FLM2 and FLM3) are additionally supplied without considerably changing circuit structures in the scan drivers 100, 200, and 300 or adding any dummy circuit, so that the pixel regions 602, 604, and 606 can be easily and independently driven. Accordingly, an increase of the peripheral region NA can be minimized.

For example, the display device according to the embodiment of the present disclosure includes the first scan driver 100 for driving the first scan lines S1[1] to S1[k], the second scan driver 200 for driving the second scan lines S2[1] to S2[n], and the third scan driver 300 for driving the third scan lines S3[1] to S3[j]. In addition, a first start signal FLM1 is supplied to the first scan driver 100, a second start signal FLM2 is supplied to the second scan driver 200, and a third start signal FLM3 is supplied to the third scan driver 300. Accordingly, the first to third scan drivers 100, 200, and 300 can be independently controlled.

In some embodiments, the first scan driver 100 is supplied with the first start signal FLM1 and first and second clock signals CLK1 and CLK2 from the timing controller 500, and drives the first scan lines S1[1] to S1[k], corresponding to the first start signal FLM1 and the first and second clock signals CLK1 and CLK2. For example, the first scan driver 100 may sequentially supply the first scan signal to the first scan lines S1[1] to S1[k] while shifting the first start signal FLM1 by using the first and second clock signals CLK1 and CLK2. In some embodiments, the number of clock signals CLK1 and CLK2 supplied to the first scan driver 100 may be modified and implemented.

If the first scan signal is supplied to the first scan lines S1[1] to S1[k], the first pixels PXL1 are sequentially selected in units of horizontal lines. To this end, the first scan signal may be set to a gate-on voltage at which transistors (e.g., switching transistors) included in the first pixels PXL1 can be turned on.

In some embodiments, the second scan driver 200 is supplied with the second start signal FLM2 and first and second clock signals CLK1 and CLK2 from the timing controller 500, and drives the second scan lines S2[1] to S2[n], corresponding to the second start signal FLM2 and the first and second clock signals CLK1 and CLK2. For example, the second scan driver 200 may sequentially supply the second scan signal to the second scan lines S2[1] to S2[n] while shifting the second start signal FLM2 by using the first and second clock signals CLK1 and CLK2. In some embodiments, the number of clock signals CLK1 and CLK2 supplied to the second scan driver 200 may be modified and implemented.

If the second scan signal is supplied to the second scan lines S2[1] to S2[n], the second pixels PXL2 are sequentially selected in units of horizontal lines. To this end, the second scan signal may be set to the gate-on voltage at which transistors (e.g., switching transistors) included in the second pixels PXL2 can be turned on.

In some embodiments, the third scan driver 300 is supplied with the third start signal FLM3 and first and second clock signals CLK1 and CLK2 from the timing controller 500, and drives the third scan lines S3[1] to S3[j], corresponding to the third start signal FLM3 and the first and second clock signals CLK1 and CLK2. For example, the third scan driver 300 may sequentially supply the third scan signal to the third scan lines S3[1] to S3[j] while shifting the third start signal FLM3 by using the first and second clock signals CLK1 and CLK2. In some embodiments, the number of clock signals CLK1 and CLK2 supplied to the third scan driver 300 may be modified and implemented.

If the third scan signal is supplied to the third scan lines S3[1] to S3[j], the third pixels PXL3 are sequentially selected in units of horizontal lines. To this end, the third scan signal may be set to the gate-on voltage at which transistors (e.g., switching transistors) included in the third pixels PXL3 can be turned on.

The data driver 400 is supplied with image data along with a data control signal DCS from the timing controller 500. The data driver 400 generates a data signal, corresponding to the data control signal DCS and the image data, and supplies the generated data signal to the data lines D1 to Dm. The data signal supplied to the data lines D1 to Dm is supplied pixels (a portion of PXL1, PXL2, and PXL3) on a horizontal line selected by a scan signal.

In some embodiments, when the display device is driven in the first mode, the data driver 400 may output a data signal corresponding to each of the horizontal lines of the entire display region 600 during each horizontal period in one frame period. In this case, the one frame period may include horizontal periods of which number corresponds to that of horizontal lines provided in the entire display region 600.

In some embodiments, when the display device is driven in the first mode, the first to third scan drivers 100, 200, and 300 may sequentially supply the first to third scan signals to the first to third scan lines S1[1] to S1[k], S2[1] to S2[n], and S3[1] to S3[j] during each frame period. Then, the data signal from the data driver 400 may be sequentially supplied to the first to third pixels PXL1, PXL2, and PXL3. Accordingly, a predetermined effective image can be displayed in the entire display region 600.

Meanwhile, when the display device is driven in the second mode, the data driver 400 may output a data signal corresponding to each of the horizontal line of a predetermined effective display region, e.g., the second pixel region 604 during each horizontal period in one frame period. In this case, the one frame period may include horizontal periods of which number corresponds to that of horizontal lines provided in the second pixel region 604. Thus, in the second mode, the number of horizontal periods constituting the one frame period decreases as compared with the first mode. Accordingly, in the second mode, although the display device is driven at a high speed as compared with the first mode, a decrease of the number of horizontal period can be compensated to an extent. According to the embodiment of the present disclosure, scan on time can be sufficiently secured even when the display device is driven at a high frequency of 75 Hz. Accordingly, it is possible to prevent or reduce the occurrence of a flicker, a spot, and/or image sticking, which may occur in the display region 600.

Additionally, if the scan on time is sufficiently secured, a desired luminance can be expressed even though the display device is driven at a relatively low voltage when an always on display (AOD) is driven to display idle screen information such as time in only a predetermined region in an idle mode. Accordingly, power consumption can be reduced by lowering an input voltage in the idle mode.

In some embodiments, when the display device is driven in the second mode, the second scan driver 200 may sequentially supply the second scan signal to the second scan lines S2[1] to S2[n] during each frame period. Then, the data signal from the data driver 400 may be sequentially supplied to the second pixels PXL2. Accordingly, a predetermined effective image can be displayed in the second pixel region 604.

In an embodiment of the present disclosure, when the display device is driven in the second mode, the third scan driver 300 may sequentially supply the third scan signal to the third scan lines S3[1] to S3[j] during a partial period (e.g., a first period in which the second scan signal is supplied to an upper end region in the second pixel region 604) in the period in which the second scan signal is sequentially supplied. Then, the data signal from the data driver 400 is supplied to third pixels PXL3 located on a predetermined horizontal line of the third display region 604, in addition to second pixels PXL2 on a corresponding horizontal line. Accordingly, a dummy image corresponding to a portion of the effective image (e.g., an image displayed in the upper end region of the second pixel region 604 can be displayed in the third display region 606.

In an embodiment of the present disclosure, when the display device is driven in the second mode, the first scan driver 100 may sequentially supply the first scan signal to the first scan lines S1[1] to S1[k] during another partial period (e.g., a second period arranged posterior to the first period) in the period in which the second scan signal is sequentially supplied. Then, the data signal from the data driver 400 is supplied to first pixels PXL1 located on a predetermined horizontal line of the first display region 602, in addition to second pixels PXL2 on a corresponding horizontal line. Accordingly, a dummy image corresponding to another portion of the effective image (e.g., an image displayed in a lower end region of the second pixel region 604) can be displayed in the first display region 602.

In some embodiments, the timing controller 500 generates the first and second clock signals CLK1 and CLK2, the first to third start signals FLM1, FLM2, and FLM3, and the data control signal DCS, based on timing signals supplied from the outside. The first and second clock signals CLK1 and CLK2 are supplied to the first scan driver 100, the second scan driver 200, and the third scan driver 300. In addition, the first start signal FLM1, the second start signal FLM2, and the third start signal FLM3 are supplied to the first scan driver 100, the second scan driver 200, and the third scan driver 300, respectively. In addition, the data control signal DCS is supplied to the data driver 400.

The first start signal FLM1 may control a supply timing of the first scan signal, the second start signal FLM2 may control a supply timing of the second scan signal, and the third start signal FLM3 may control a supply timing of the third scan signal. In addition, the first and second clock signals CLK1 and CLK2 may be used to shift the first start signal FLM1, the second start signal FLM2, and/or the third start signal FLM3.

In an embodiment of the present disclosure, the supply timings and widths of the first start signal FLM1, the second start signal FLM2, and/or the third start signal FLM3 may be determined corresponding to each mode. That is, the timing controller 500 may supply predetermined first, second, and third start signals FLM1, FLM2, and FLM3 to the respective first, second, and third scan drivers 100, 200, and 300, corresponding to each of the first and second modes.

The data control signal DCS may include a source start signal, a source output enable signal, a source sampling clock, and the like. The source start signal may control a data sampling start time of the data driver 400. The source sampling clock may control a sampling operation of the data driver 400, based on a rising edge or falling edge. The source output enable signal may control an output timing of the data driver 400.

In addition, the timing controller 500 may rearrange image data input from a host system or the like, and transmit the rearranged image data to the data driver 400. For example, the timing controller 500 may convert image data to correspond to a predetermined region in which an effective image is displayed, and transmit the converted image data to the data driver 400, corresponding to the first mode or the second mode. Alternatively, the timing controller 500 may be supplied image data corresponding to the region in which the effective image is displayed, rearrange the image data, and then transmit the rearranged image data to the data driver 400. Then, the data driver 400 generates a data signal corresponding to the image data supplied from the timing controller 500, and outputs the generated data signal to the data lines D1 to Dm.

In some embodiment, when emission control transistors for controlling emission times of the respective pixels PXL1, PXL2, and PXL3 are included, emission control lines E1[1] to E1[k], E2[1] to E2[n], and E3[1] to E3[j] may be further provided in the display region 600. For example, first emission control lines E1[1] to E1[k] coupled to the first pixels PXL1 may be provided in the first pixel region 602, and second emission control lines E2[1] to E2[n] coupled to the second pixel PXL2 may be provided in the second pixel region 604. In addition, third emission control lines E3[1] to E3[j] coupled to the third pixels PXL3 may be provided in the third pixel region 606.

Also, in the above-described embodiment, the display device may additionally include emission control drivers 700, 800, and 900 for driving the emission control lines E1[1] to E1[k], E2[1] to E2[n], and E3[1] to E3[j]. For example, the display device may additionally include a first emission control driver 700 for controlling emission times of the first pixels PXL1 through the first emission control lines E1[1] to E1[k], a second emission control driver 800 for controlling emission times of the second pixels PXL2 through the second emission control lines E2[1] to E2[n], and a third emission control driver 900 for controlling emission times of the third pixels PXL3 through the third emission control lines E3[1] to E3[j].

In this case, the timing controller 500 may supply a first emission start signal EFLM1 to the first emission control driver 700, supply a second emission start signal EFLM2 to the second emission control driver 800, and supply a third emission start signal EFLM3 to the third emission control driver 900. Also, the timing controller 500 may supply predetermined clock signals, e.g., third and fourth clock signals CLK3 and CLK4 to the first to third emission control drivers 700, 800, and 900. Accordingly, the first to third emission control drivers 700, 800, and 900 can be independently controlled.

The first emission start signal EFLM1 may control a supply timing of a first emission control signal, the second emission start signal EFLM2 may control a supply timing of a second emission control signal, and the third emission start signal EFLM3 may control a supply timing of a third emission control signal. In addition, the third and fourth clock signals CLK3 and CLK4 may be used to shift the first emission start signal EFLM1, the second emission start signal EFLM2, and/or the third emission start signal EFLM3.

According to the embodiment of the present disclosure, although the first to third scan lines S1[1] to S1[k], S2[1] to S2[n], and S3[1] to S3[j] are driven in different orders in the first mode and the second mode, the emission times of the first to third pixels PXL1, PXL2, and PXL3 can be independently controlled to correspond to the driving times of the first to third scan lines S1[1] to S1[k], S2[1] to S2[n], and S3[1] to S3[j]. Further, according to the embodiment of the present disclosure, when the display device is driven in the second mode, the emission times of the pixels PXL1, PXL2, and PXL3 are controlled for the respective pixel regions 602, 604, and 606, so that the emission luminances of the pixel regions 602, 604, and 606 can be independently controlled.

In some embodiments, the first emission control driver 700 may be coupled to the first emission control lines E1[1] to E1[k], to sequentially drive the first emission control lines E1[1] to E1[k]. For example, the first emission driver 700 may sequentially supply the first emission control signal to the first emission control lines E1[1] to E1[k] while shifting the first emission start signal EFLM1 by using the third and fourth clocks CLK3 and CLK4.

In some embodiments, the second emission control driver 800 may be coupled to the second emission control lines E2[1] to E2[n], to sequentially drive the second emission control lines E2[1] to E2[n]. For example, the second emission driver 800 may sequentially supply the second emission control signal to the second emission control lines E2[1] to E2[n] while shifting the second emission start signal EFLM2 by using the third and fourth clocks CLK3 and CLK4.

In some embodiments, the third emission control driver 900 may be coupled to the third emission control lines E3[1] to E3[j], to sequentially drive the third emission control lines E3[1] to E3[j]. For example, the third emission driver 900 may sequentially supply the third emission control signal to the third emission control lines E3[1] to E3[j] while shifting the third emission start signal EFLM3 by using the third and fourth clocks CLK3 and CLK4.

In some embodiments, the first to third emission control signals may be set to a gate-off voltage at which predetermined transistors included in the first to third pixels PXL1, PXL2, and PXL3 can be turned off.

In some embodiments, the number of first emission control lines E1[1] to E1[k] and/or third emission control lines E3[1] to E3[j] may be variously set to at least two by considering a region overlapping with the frame 31.

As described above, the display device according to the embodiment of the present disclosure supplies the start signals FLM1, FLM2, FLM3, EFLM1, EFLM2, and EFLM3 to the scan drivers 100, 200, and 300 and/or the emission control drivers 700, 800, and 900, respectively. Accordingly, the pixel regions 602, 604, and 606 can be independently driven. According to the embodiment of the present disclosure, the driving times, driving methods, and/or emission times (or luminances) of the pixels PXL1, PXL2, and PXL3 can be controlled in different manners, corresponding to the first mode and the second mode. According to the embodiment of the present disclosure, the pixel regions 602, 604, and 606 can be independently driven by respectively supplying the start signals FLM1, FLM2, FLM3, EFLM1, EFLM2, and EFLM3 to the scan drivers 100, 200, and 300 and/or the emission control drivers 700, 800, and 900, without considerably changing the structures of the scan drivers 100, 200, and 300 and/or the emission control drivers 700, 800, and 900 or adding any dummy circuit, etc.

Figure 4:
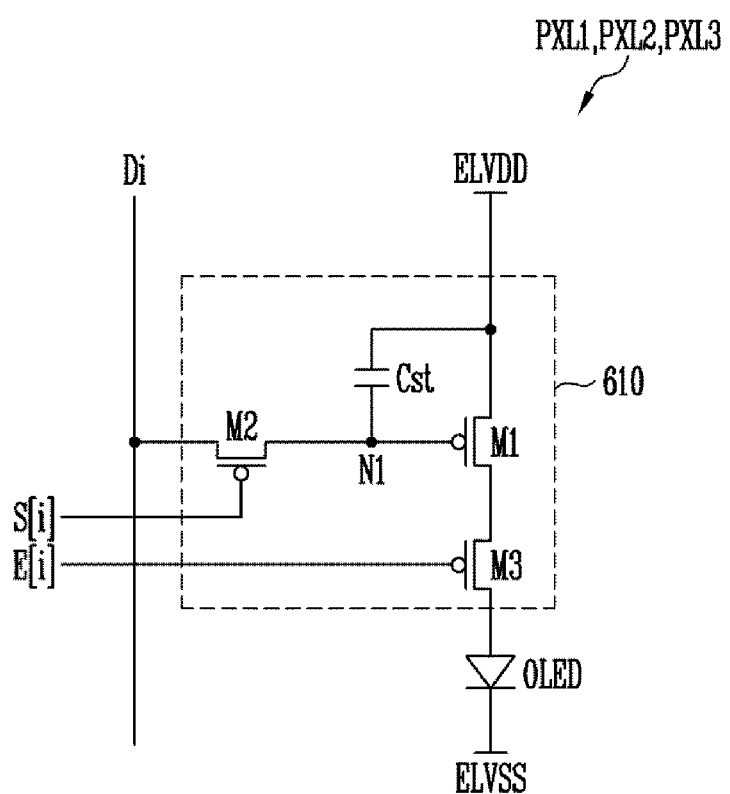
FIG. 4 illustrates an embodiment of a pixel shown in FIG. 3.

FIG. 4 illustrates an embodiment of the pixel shown in FIG. 3. For convenience, a pixel (any one of the first to third pixels) coupled an ith (i is a natural number) data line and an ith scan line (any one of the first to third scan lines) is illustrated in FIG. 4.

Referring to FIG. 4, the pixel PXL1, PXL2, or PXL3 according to the embodiment of the present disclosure includes an organic light emitting diode OLED and a pixel circuit 610.

An anode electrode of the organic light emitting diode OLED is coupled to the pixel circuit 610, and a cathode electrode of the organic light emitting diode OLED is coupled to the second power source ELVSS. The organic light emitting diode OLED generates light with a predetermined luminance corresponding to a driving current supplied from the pixel circuit 610.

The pixel circuit 610 controls a driving current flowing from the first power source ELVDD to the second power source ELVSS via the organic light emitting diode OLED, corresponding to a data signal. To this end, the pixel circuit 610 includes first to third transistors M1, M2, and M3 and a storage capacitor Cst.

The first transistor (driving transistor) M1 is coupled between the first power source ELVDD and the organic light emitting diode OLED. In addition, a gate electrode of the first transistor M1 is coupled to a first node N1. The first transistor M1 controls the amount of the driving current flowing the first power source ELVDD to the second power source ELVSS via the organic light emitting diode OLED, corresponding to a voltage of the first node N1.

The second transistor (switching transistor) M2 is coupled between a data line Di and the first node N1. In addition, a gate electrode of the second transistor M2 is coupled to a scan line S[i]. The second transistor M2 is turned on when a scan signal is supplied to the scan line S[i], to allow the data line Di and the first node N1 to be electrically coupled to each other.

The third transistor (emission control transistor) M3 is coupled between the first transistor M1 and the organic light emitting diode OLED. In addition, a gate electrode of the third transistor M3 is coupled to an emission control line E[i]. Meanwhile, in another embodiment, the third transistor M3 may be coupled between the first power source ELVDD and the first transistor M1. That is, the third transistor M3 may be provided on a current path of the driving current.

The third transistor M3 is turned off when an emission control signal having the gate-off voltage is supplied to the emission control line E[i], to block the driving current from flowing through the organic light emitting diode OLED. For example, the third transistor M3 may block the driving current from flowing in the pixel PXL1, PXL2, or PXL3 during a period in which a data signal is transmitted to the inside of the pixel PXL1, PXL2, or PXL3 by the second transistor to be charged in the storage capacitor Cst. Accordingly, it is possible to prevent (or reduce instances of) the pixel PXL1, PXL2, or PXL3 from emitting light with an undesired luminance. Meanwhile, an emission control signal having the gate-on voltage may be supplied to the emission control line E[i] at a predetermined time after a data signal of a corresponding frame is charged in the storage capacitor Cst. Accordingly, the driving current can be transmitted to the organic light emitting diode OLED as the third transistor M3 is turned on. According to the embodiment of the present disclosure, the turn-on time and/or turn-on period of the third transistor M3 is controlled, so that it is possible to control the emission time and/or emission maintenance time (or luminance) of each pixel PXL1, PXL2, or PXL3.

The storage capacitor Cst is coupled between the first power source ELVDD and the first node N1. The storage capacitor Cst stores a voltage corresponding to the data signal supplied to the first node N1.

An operation process of the pixel PXL1, PXL2, or PXL3 will be described. First, as the scan signal is supplied to the scan line S[i], the second transistor M2 is turned on. If the second transistor M2 is turned on, the data signal from the data line Di is supplied to the first node N1. At this time, a voltage corresponding to the data signal is stored in the storage capacitor Cst. In some embodiments, the emission control signal having the gate-off voltage is supplied during a period in which at least the scan signal is supplied, so that the third transistor M3 can be maintained in the off-state. Accordingly, the voltage of the data signal can be stably stored in the storage capacitor Cst, and the pixel PXL1, PXL2, or PXL3 can be prevented from emitting light with an undesired luminance.

The second transistor M2 is turned off after the voltage corresponding to the data signal is stored in the storage capacitor Cst.

After that, if the emission control signal having the gate-on voltage is supplied to the emission control line E[i], the third transistor M3 is turned on. Accordingly, a current path passing through the organic light emitting diode OLED is formed. At this time, the first transistor M1 controls the driving current flowing from the first power source ELVDD to the second power source ELVSS via the organic light emitting diode OLED, corresponding to the voltage of the first node N1. Then, the organic light emitting diode OLED generates light with a luminance corresponding to the driving current. Meanwhile, if a data signal corresponding to a black gray level is supplied to the first node N1, the first transistor M1 does not supply the driving current to the organic light emitting diode OLED. In this case, the organic light emitting diode OLED does not emit light, thereby displaying the black gray level.

The pixel PXL1, PXL2, or PXL3 displays a predetermined image while the above-described process. Additionally, in an embodiment of the present disclosure, the pixel circuit of the pixel PXL1, PXL2, or PXL3 is not limited by the embodiment shown in FIG. 4. For example, the pixel PXL1, PXL2, or PXL3 may include various types of pixel circuits currently known in the art. For example, in another embodiment, the pixel circuit 610 may additionally include one or more transistors (not shown) and/or one or more capacitors (not shown). Alternatively, in still another embodiment, the third transistor M3 may be omitted.

Figure 5:
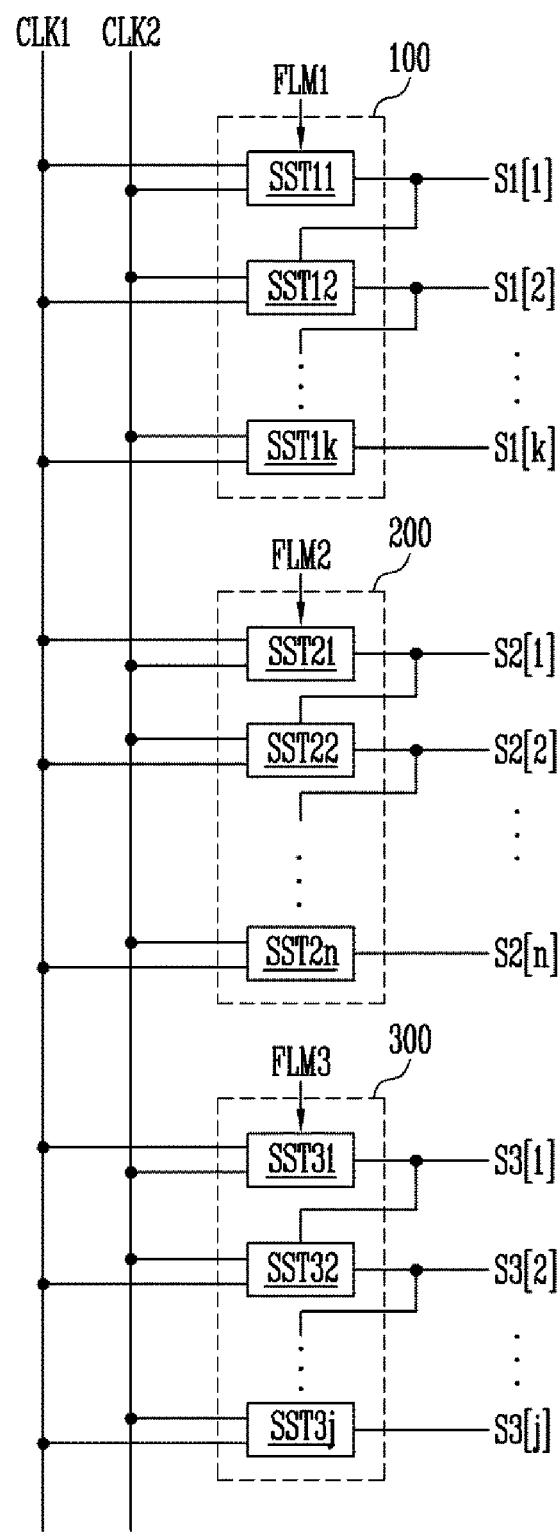
FIG. 5 illustrates an embodiment of scan drivers shown in FIG. 3.

FIG. 5 illustrates an embodiment of the scan drivers shown in FIG. 3. An embodiment in which the scan drivers are driven by two clock signals is disclosed in FIG. 5, but the present disclosure is not limited thereto. That is, the number and/or kind of clock signals input to the scan drivers may be variously changed.

Referring to FIG. 5, in some embodiments, the first scan driver 100 includes a plurality of first scan stages SST11 to SST1k for driving the first scan lines S1[1] to S1[k]. For example, an ith first scan stage SST1i may be coupled to an ith first scan line S1[i], to supply a first scan signal to the ith first scan line S1[i]. In some embodiments, the number of first scan stages SST11 to SST1k may be variously changed depending on the number of horizontal lines provided in the first pixel region 602.

In some embodiments, the first scan stages SST11 to SST1k may be supplied with a first start signal FLM1 and first and second clock signals CLK1 and CLK2, and shift the first start signal FLM1 by using the first and second clock signals CLK1 and CLK2. Accordingly, the first scan driver 100 sequentially supplies the first scan signal to the first scan lines S1[1] to S1[k], so that the first scan lines S1[1] to S1[k] can be driven.

For example, a first first scan stage SST11 may supply a first scan signal to a first first scan line S1[1], corresponding to the first start signal FLM1. In addition, each of the other first scan stages SST12 to SST1k may supply a first scan signal to a first scan line (any one of S1[2] to S1[k], corresponding to as an output signal of a previous stage thereof (e.g., a first scan signal of the previous stage). That is, the supply times of the first scan signals supplied to the respective first scan lines S1[1] to S1[k] may be determined corresponding to the supply time of the first start signal FLM1.

In some embodiments, the second scan driver 200 includes a plurality of second scan stages SST21 to SST2n for driving the second scan lines S2[1] to S2[n]. For example, an ith second scan stage SST2i may be coupled to an ith second scan line S2[i], to supply a second scan signal to the ith second scan line S2[i]. In some embodiments, the number of second scan stages SST21 to SST2n may be variously changed depending on the number of horizontal lines provided in the second pixel region 604.

In some embodiments, the second scan stages SST21 to SST2n may be supplied with a second start signal FLM2 and first and second clock signals CLK1 and CLK2, and shift the second start signal FLM2 by using the first and second clock signals CLK1 and CLK2. Accordingly, the second scan driver 200 sequentially supplies the second scan signal to the second scan lines S2[1] to S2[n], so that the second scan lines S2[1] to S2[n] can be driven.

For example, a first second scan stage SST21 may supply a second scan signal to a first second scan line S2[1], corresponding to the second start signal FLM2. In addition, each of the other second scan stages SST22 to SST2n may supply a second scan signal to a second scan line (any one of S2[2] to S2[n], corresponding to as an output signal of a previous stage thereof (e.g., a second scan signal of the previous stage). That is, the supply times of the second scan signals supplied to the respective second scan lines S2[1] to S2[n] may be determined corresponding to the supply time of the second start signal FLM2.

In some embodiments, the third scan driver 300 includes a plurality of third scan stages SST31 to SST3j for driving the third scan lines S3[1] to S3[j]. For example, an ith third scan stage SST3i may be coupled to an ith third scan line S3[i], to supply a third scan signal to the ith third scan line S3[i]. In some embodiments, the number of third scan stages SST31 to SST3j may be variously changed depending on the number of horizontal lines provided in the third pixel region 606.

In some embodiments, the third scan stages SST31 to SST3j may be supplied with a third start signal FLM3 and first and second clock signals CLK1 and CLK2, and shift the third start signal FLM3 by using the first and second clock signals CLK1 and CLK2. Accordingly, the third scan driver 300 sequentially supplies the third scan signal to the third scan lines S3[1] to S3[j], so that the third scan lines S3[1] to S3[j] can be driven.

For example, a first third scan stage SST31 may supply a third scan signal to a first third scan line S3[1], corresponding to the third start signal FLM3. In addition, each of the other third scan stages SST32 to SST3j may supply a third scan signal to a third scan line (any one of S3[2] to S3[j], corresponding to as an output signal of a previous stage thereof (e.g., a third scan signal of the previous stage). That is, the supply times of the third scan signals supplied to the respective third scan lines S3[1] to S3[j] may be determined corresponding to the supply time of the third start signal FLM3.

Meanwhile, in an embodiment of the present disclosure, the configuration of the scan stages SST11 to SST1k, SST21 to SST2n, and SST31 to SST3j is not particularly limited. That is, the scan stages SST11 to SST1k, SST21 to SST2n, and SST31 to SST3j may be implemented with various types of scan driving circuits currently known in the art.

Figure 6:
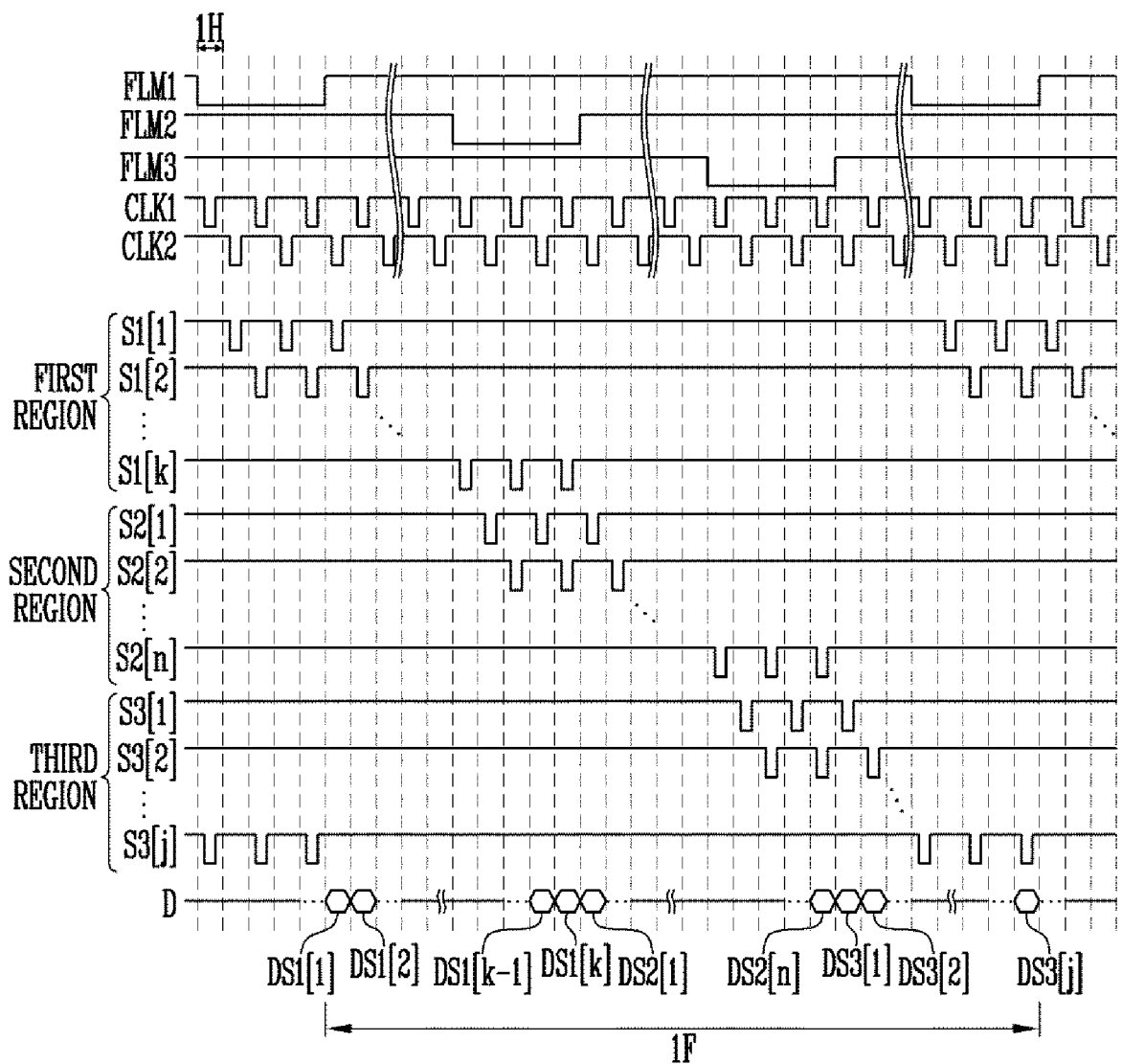
FIG. 6 illustrates an embodiment of driving timings of the scan drivers when the display device shown in FIG. 3 is driven in a first mode.

FIG. 6 illustrates an embodiment of driving timings of the scan drivers when the display device shown in FIG. 3 is driven in the first mode. For example, FIG. 6 illustrates an embodiment of start signals and clock signals input to the scan drivers, corresponding to the first mode, and scan signals output from the scan drivers, corresponding to the start signals and the clock signals. Meanwhile, FIG. 6 illustrates example input/output signals of the scan drivers, in which a case where scan signals output to odd-numbered scan lines are synchronized with the second clock signal is illustrated as an example. However, this may be changed depending on circuit configurations of the scan drivers, input terminals of the clock signals, or the like.

Figure 7:
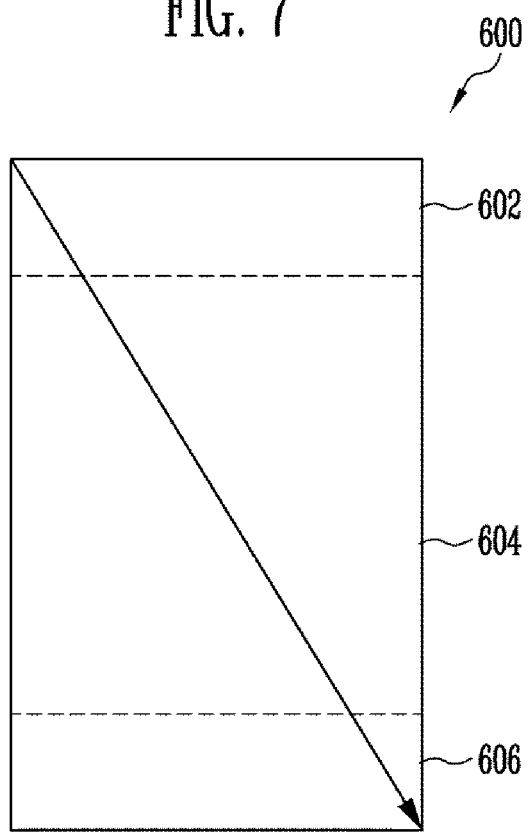
FIG. 7 schematically illustrates a driving sequence of scan lines provided in a display region when the display device shown in FIG. 3 is driven in the first mode.
Figure 8:
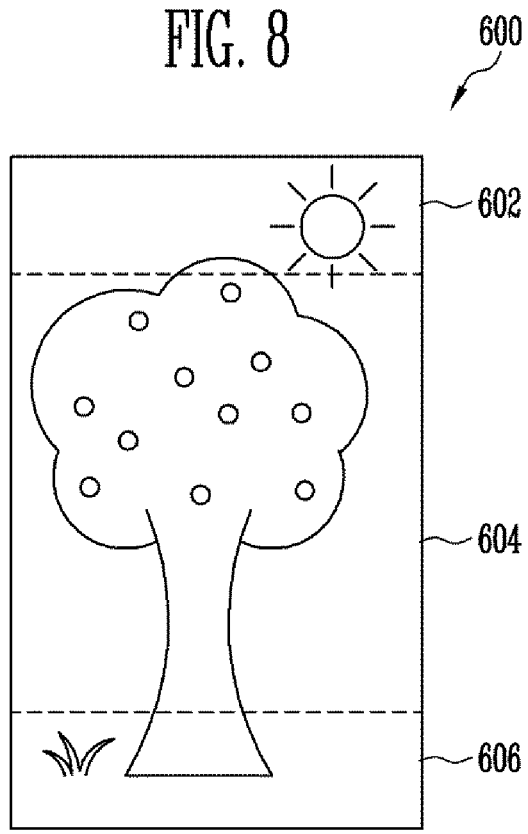
FIG. 8 illustrates an embodiment of an image displayed in the display region when the display device shown in FIG. 3 is driven in the first mode.

Meanwhile, FIG. 7 schematically illustrates a driving sequence of the scan lines provided in the display region when the display device shown in FIG. 3 is driven in the first mode. FIG. 8 illustrates an embodiment of an image displayed in the display region when the display device shown in FIG. 3 is driven in the first mode. Hereinafter, an operation of the display device according to the embodiment of the present disclosure in the first mode will be described with reference to FIGS. 6 to 8 in conjunction with FIGS. 3 to 5.

According to an embodiment of the present disclosure, when the display device is driven in the first mode, the timing controller 500 sequentially supplies the first start signal FLM1, the second start signal FLM2, and the third start signal FLM3 respectively to the first scan driver 100, the second scan driver 200, and the third scan driver 300. Here, the supply timings of the first start signal FLM1, the second start signal FLM2, and the third start signal FLM3 are set such that the first scan signal, the second scan signal, and the third scan signal are sequentially supplied to the first scan lines S1[1] to S1[k], the second scan lines S2[1] to S2[n], and the third scan lines S3[1] to S3[j], respectively. That is, when the display device is driven in the first mode, the first region 602, the second pixel region 604, and the third pixel region 606 may be sequentially scanned as shown in FIGS. 6 and 7.

In some embodiments, when the display device is driven in the first mode, the first start signal FLM1, the second start signal FLM2, and the third start signal FLM3 may have the same width, and the width may be changed. For example, each of the first to third start signals FLM1, FLM2, and FLM3 has a width of one horizontal period 1H, and the first to third start signals FLM1, FLM2, and FLM3 may have the same width. In this case, the first, second, and third pixels PXL1, PXL2, and PXL3 may be supplied with the same number of scan signals during each frame period.

In some embodiments, the width of each of the first to third start signals FLM1, FLM2, and FLM3 is controlled, so that it is possible to control the number of scan signals supplied to each of the scan lines S1[1] to S1[k], S2[1] to S2[n], and S3[1] to S3[j]. That is, when the display device is driven in the first mode, the first, second, and third scan drivers 100, 200, and 300 may sequentially supply r (r is a natural number of 1 or more) scan signals respectively to the first, second, and third scan lines S1[1] to S1[k], S2[1] to S2[n], and S3[1] to S3[j].

For example, when the period of the first and second clock signals CLK1 and CLK2 is set to two horizontal periods 2H, the width of the first to third start signals FLM1, FLM2, and FLM3 is set to two horizontal periods 2H or less, so that one scan signal can be supplied to each of the scan lines S1[1] to S1[k], S2[1] to S2[n], and S3[1] to S3[j] during each frame period.

Alternatively, in some embodiments, the width of the first to third start signals FLM1, FLM2, and FLM3 is set to three horizontal periods 3H or more, so that a plurality of scan signals can be supplied to each of the scan lines S1[1] to S1[k], S2[1] to S2[n], and S3[1] to S3[j] during each frame period. For example, when a motion clarity clock (hereinafter, referred to as an "MC CLK") required to satisfy a predetermined image quality reference is MC 3.0 CLK, the width of the first to third start signals FLM1, FLM2, and FLM3 may be set to five horizontal periods 5H (or six horizontal periods 6H) as shown in FIG. 6. Accordingly, three scan signals can be supplied to each of the scan lines S1[1] to S1[k], S2[1] to S2[n], and S3[1] to S3[j] during each frame period.

As described above, if a plurality of scan signals are supplied to each of the scan lines S1[1] to S1[k], S2[1] to S2[n], and S3[1] to S3[j] during each frame period, the transistors included in the pixels PXL1, PXL2, and PXL3 are repeatedly turned on/off during each frame period, and accordingly, response characteristics of the pixels PXL1, PXL2, and PXL3 can be improved.

For example, if a plurality of scan signals are supplied to the pixels PXL1, PXL2, and PXL3 during one frame period, the second transistor M2 is turned on plural times to transmit the data signal from the data line Di to the first node N1 as shown in FIG. 4. Then, the first transistor M1 may be turned on corresponding to the voltage of the first node N1. At this time, the emission of the pixels PXL1, PXL2, and PXL3 during a period in which at least the scan signal is supplied can be prevented (or reduced) by controlling driving times of the emission control lines E1[1] to E1[k], E2[1] to E2[n], and E3[1] to E3[j].

In some embodiments, the last scan signal supplied to each scan line (any one of S1[1] to S1[k], S2[1] to S2[n], and S3[1] to S3[j]) during each frame period may be set as a current scan signal. In this case, the data driver 400 may output a data signal corresponding to a corresponding horizontal line to a data line Di (D1 to Dm) to be synchronized with the last scan signal. For example, when the last first scan signal of a corresponding frame period is supplied to the first first scan line S1[1], the data driver 400 may output a data signal DS1[1] corresponding to the first horizontal line of the first pixel region 602 to be synchronized with the last first scan signal. In the above-described manner, data signals DS1[1] to DS1[k], DS2[1] to DS2[n], and DS3[1] to DS3[j] may be sequentially supplied respectively to the first to last horizontal lines of the first pixel region 602, the first to last horizontal lines of the second pixel region 604, and the first and last horizontal lines of the third pixel region 606 while sequentially driving the first to third scan lines S1[1] to S1[k], S2[1] to S2[n], and S3[1] to S3[j].

Meanwhile, the pixels PXL1, PXL2, and PXL3 may emit light after scanning of a corresponding horizontal line is completed during each frame period. Thus, as a desired data signal is stored in each storage capacitor Cst, the pixels PXL1, PXL2, and PXL3 emit light with a luminance corresponding to the data signal.

When the display device is driven in the first mode, the first, second, and third scan drivers 100, 200, and 300 sequentially supply scan signals to all of the scan lines S1[1] to S1[k], S2[1] to S2[n], and S3[1] to S3[j] in the display region 600 while repeating the above-described operation.

Accordingly, as shown in FIG. 7, the scan lines S1[1] to S1[k], S2[1] to S2[n], and S3[1] to S3[j] are sequentially driven in an order of the first pixel region 602, the second pixel region 604, and the third pixel region 606. For example, as first to third pixels PXL1, PXL2, and PXL3 provided on each horizontal line of the display region are sequentially selected, the data signals DS1[1] to DS1[k], DS2[1] to DS2[n], and DS3[1] to DS3[j] may be supplied during one frame period.

Accordingly, a predetermined effective image corresponding to the data signals DS1[1] to DS1[k], DS2[1] to DS2[n], and DS3[1] to DS3[j] can be displayed in the entire display region 600. For example, as shown in FIG. 8, one connected screen may be implemented by connecting images displayed in the first to third pixel regions 602, 604, and 606.

Particularly, in an embodiment of the present disclosure, light emission is started after the driving transistor (e.g., the first transistor M1) provided in each of the pixels PXL1, PXL2, and PXL3 is turned on several times, so that the response characteristic of the driving transistor can be improved. Accordingly, the image quality of the display device can be improved.

Figure 9:
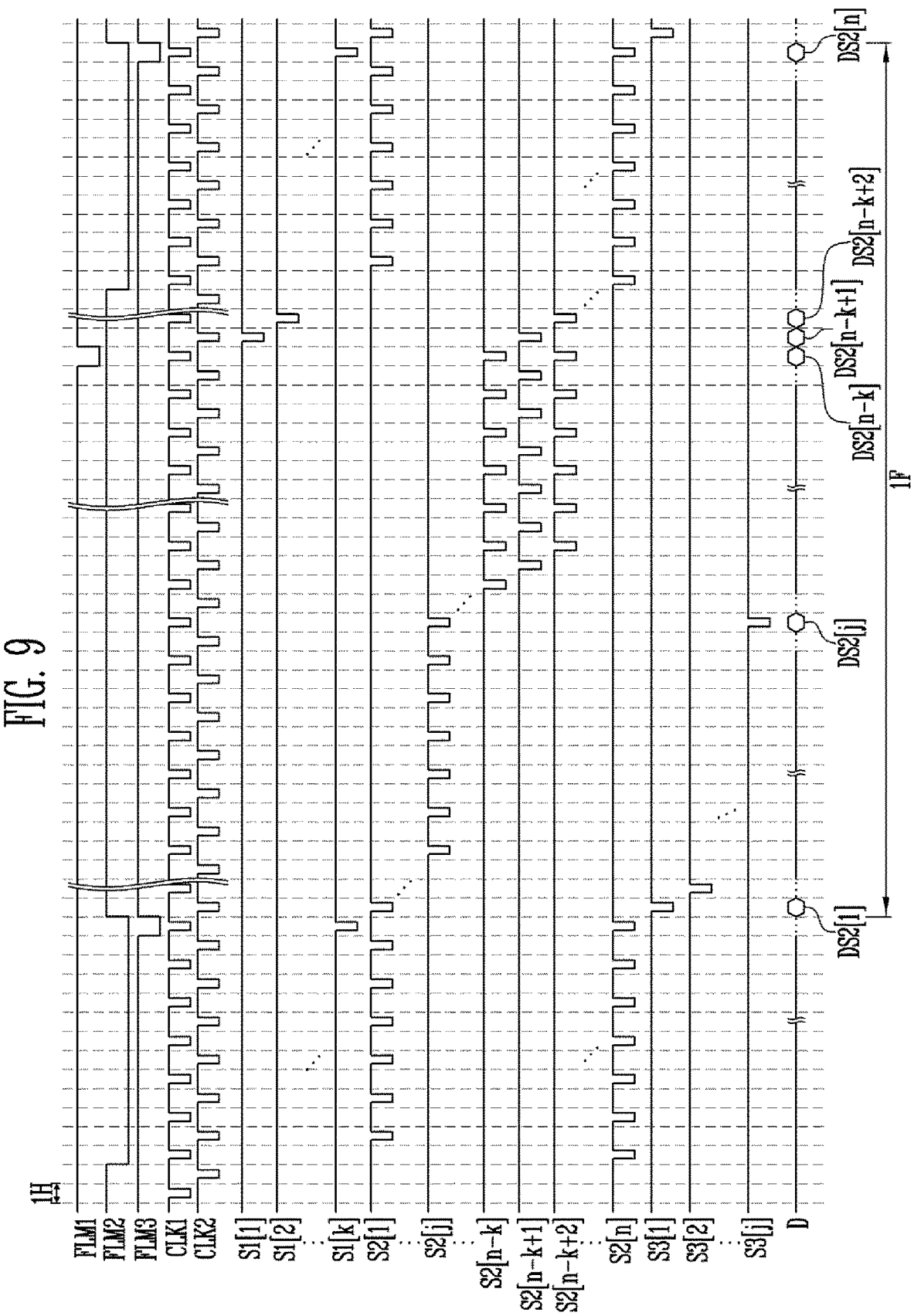
FIG. 9 illustrates an embodiment of driving timings of the scan drivers when the display device shown in FIG. 3 is driven in a second mode.

FIG. 9 illustrates an embodiment of driving timings of the scan drivers when the display device shown in FIG. 3 is driven in the second mode. For example, FIG. 9 illustrates an embodiment of start signals and clock signals input to the scan drivers, corresponding to the second mode, and scan signals output from the scan drivers, corresponding to the start signals and the clock signals.

Figure 10:
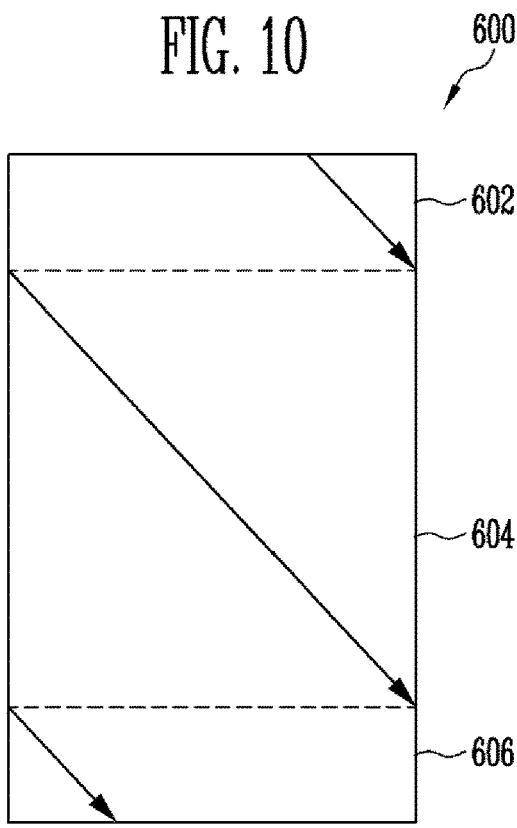
FIG. 10 schematically illustrates a driving sequence of scan lines provided in the display region when the display device shown in FIG. 3 is driven in the second mode.
Figure 11:
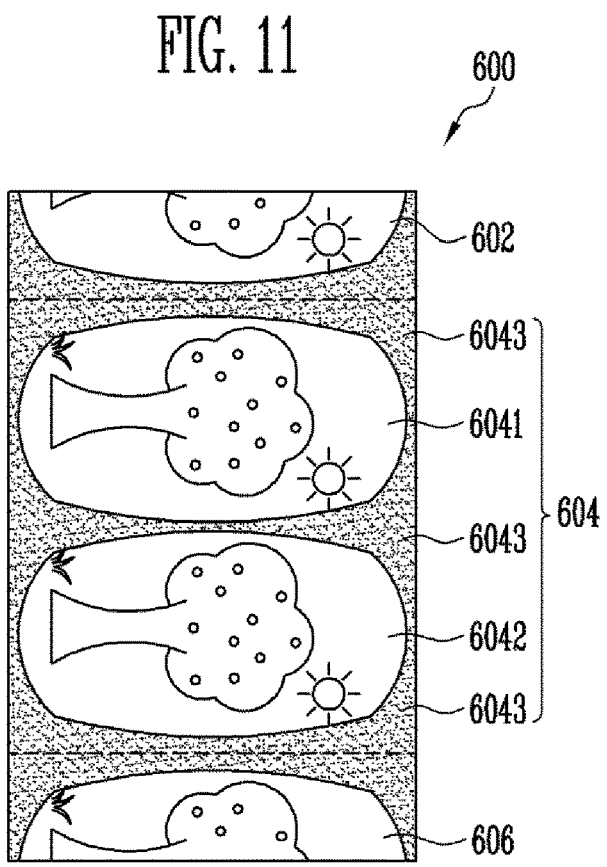
FIG. 11 illustrates an embodiment of an image displayed in the display region when the display device shown in FIG. 3 is driven in the second mode.

Meanwhile, FIG. 10 schematically illustrates a driving sequence of the scan lines provided in the display region when the display device shown in FIG. 3 is driven in the second mode. FIG. 11 illustrates an embodiment of an image displayed in the display region when the display device shown in FIG. 3 is driven in the second mode. Hereinafter, an operation of the display device according to the embodiment of the present disclosure in the second mode will be described with reference to FIGS. 9 to 11 in conjunction with FIGS. 3 to 5.

According to an embodiment of the present disclosure, when the display device is driven in the second mode, the timing controller 500 supplies, in a predetermined order, the first start signal FLM1, the second start signal FLM2, and the third start signal FLM3 respectively to the first scan driver 100, the second scan driver 200, and the third scan driver 300. Here, the supply timings of the first start signal FLM1, the second start signal FLM2, and the third start signal FLM3 may be set such that the first and third scan lines S1[1] to S1[k] and S3[1] to S3[j] are driven during at least a partial period in a period in which the second scan lines S2[1] to S2[n] are sequentially driven. Accordingly, the time necessary for high-speed driving of the second pixel region 604 can be secured, and characteristic differences that may occur between the pixel regions 602, 604, and 606 can be prevented or reduced.

In an embodiment of the present disclosure, during the period in which the display device is driven in the second mode, the number of scan signals supplied to the second pixel region set as an effective display region may be set different from that of scan signals supplied to the remaining region (i.e., the first and third pixel regions 602 and 606) except the effective display region. For example, the first and third scan drivers 100 and 300 may supply p (p is a natural number of 1 or more) first and third scan signals to each of the first and third scan lines S1[1] to S1[k] and S3[1] to S3[j] during one frame period, corresponding to the second mode, and the second scan driver 200 may supply q (q is a natural number greater than p) second scan signals to each of the second scan lines S2[1] to S2[n] during the one frame period, corresponding to the second mode.

To this end, the timing controller 500 may supply the first and third start signals FLM1 and FLM3 having a predetermined width respectively to the first and third scan drivers 100 and 300, and supply the second start signal FLM2 having a width wider than that of the first and third start signals FLM1 and FLM2 to the second scan driver 200. For example, the second start signal FLM2 may have a width wider by two horizontal periods 2H than that of the first and third start signals FLM1 and FLM3. Accordingly, during the period in which the display device is driven in the second mode, scan signals of which number is greater than that of scan signals supplied to each of the first and third scan lines S1[1] to S1[k] and S3[1] to S3[j] may be supplied to each of the second scan lines S2[1] to S2[n].

In some embodiments, the second start signal FLM2 is set such that a plurality of second scan signals are supplied to each of the second scan lines S2[1] to S2[n] during one frame period, corresponding to the second mode. For example, when the MC CLK required to satisfy a predetermined image quality reference is MC 3.0 CLK, the second start signal FLM2 may be set such that three or more second scan signals are supplied to each of the second scan lines S2[1] to S2[n].

Meanwhile, in some embodiments, during the period in which the display device is driven in the second mode, a 3D image may be displayed by driving the second pixel region 604 at a high speed as compared with the first mode. In this case, in the second mode, an MC CLK higher than that in the first mode may be required so as to satisfy the image quality reference in the implementation of a 3D image. Therefore, when the display device is driven in the second mode, the second start signal FLM2 may be set such that second scan signals of which number is greater than that in the first mode are supplied to each of the second scan lines S2[1] to S2[n] during one frame period.

In an embodiment, when assuming that MC 7.0 CLK or more is required during the period in which the display device is driven in the second mode, the second start signal FLM2 may be set such that seven second scan signals are supplied to each of the second scan lines S2[1] to S2[n] during one frame period. For example, the second start signal FLM2 may have a width of about 13 horizontal periods 13H to about 14 horizontal periods 14H. Accordingly, the response speed of the second pixels PXL2 can be improved. Thus, a high-quality image can be displayed even when the display device is driven at a high speed.

Meanwhile, the first and third start signals FLM1 and FLM3 may be set such that the first and third pixel regions 602 and 606 are minimally driven during the period in which the display device is driven in the second mode. For example, the first and third start signals FLM1 and FLM3 may be set such that one scan signal is supplied to each of the first scan lines S1[1] to S1[k] during one frame period, corresponding to the second mode, and one third scan signal is supplied to each of the third scan lines S3[1] to S3[j] during the one frame period, corresponding to the second mode. The first and third start signals FLM1 and FLM3 may have the same width, but the present disclosure is not limited thereto.

Accordingly, within a range that minimizes the line load applied to a driving circuit including the first scan driver 100, the second scan driver 200, and/or the third scan driver 300, a data signal (e.g., a data signal having a similar voltage) can be continuously applied to the entire display region 600 by driving all of the first to third scan lines S1[1] to S1[k], S2[1] to S2[n], and S3[1] to S3[j]. Thus, it is possible to prevent or reduce characteristic differences between the pixels PXL1, PXL2, and PXL3 provided in the effective display region (i.e., the second pixel region 604) and the remaining region (i.e., the first and third pixel regions 602 and 606). Accordingly, the occurrence of image sticking can be prevented, and the image quality of the display device can be improved.

Meanwhile, in some embodiments, the first, second, and third start signals FLM1, FLM2, and FLM3 may be supplied at a specific time such that the first scan lines S1[1] to S1[k] ad the third scan lines S3[1] to S3[j] are respectively driven during different partial periods in a period in which the second scan lines S2[1] to S2[n] are sequentially driven. Accordingly, during the period in which the display device is driven in the second mode, the first and third scan drivers 100 and 300 drive the first and third scan lines S1[1] to S1[k] and S3[1] to S3[j] during different partial periods in the period in which the second scan lines S2[1] to S2[n] are sequentially driven, respectively.

In an embodiment of the present disclosure, when the display device is driven in the second mode, the supply timings of the first to third start signals FLM1, FLM2, and FLM3 may be set such that a dummy image corresponding to an image of one region adjacent to the third pixel region 606 in an effective image displayed in the second pixel region 604 is displayed in the first pixel region 602, and a dummy image corresponding to an image of one region adjacent to the first pixel region 602 in the effective image is displayed in the third pixel region 606. For example, the timing controller 500 may supply the second start signal FLM2 to the second scan driver 200, corresponding to the second mode, and supply the third start signal FLM3 to the third scan driver 300 during the period in which the second start signal FLM2 is supplied.

In this case, the third scan driver 300 may sequentially drives the third scan lines S3[1] to S3[*j*] during a first period (e.g., an initial period of each frame) in the period in which the second driver 200 sequentially drives the second scan lines S2[1] to S2[*n*]. In addition, the first scan driver 100 may sequentially drive the first scan lines S1[1] to S1[*k*] during a predetermined second period (e.g., a latter period of each frame) after the driving of the third scan lines S3[1] to S3[*j*] is completed.

For example, as shown in FIG. 9, when the display device is driven in the second mode, the first scan driver 100 may sequentially drive k first scan lines S1[1] to S1[*k*] during a period in which k second scan lines S2[*n*−k+1] to S2[*n*] adjacent to the third pixel region 606 among the second scan lines S2[1] to S2[*n*] are driven. In addition, the third scan driver 300 may sequentially drive the third scan lines S3[1] to S3[*j*] during a period in which j second scan lines S2[1] to S2[*j*] adjacent to the first pixel region 602 among the second scan lines S2[1] to S2[*n*] are driven.

That is, corresponding to the second mode, the second and third scan drivers 200 and 300 may simultaneously (e.g., concurrently) supply one or more scan signals (particularly, a current scan signal finally supplied among scan signals supplied to the respective scan lines S during each frame period) to the first second scan line S2[1] and the first third scan line S3[1]. In addition, the first scan driver 100 may be supplied with the first start signal FLM1 from the timing controller 500 after the driving of the third scan lines S3[1] to S3[*j*] is completed, and output a scan signal to the first first scan line S1[1], corresponding to the first start signal FLM1. Also, the first scan driver 100 may output a scan signal to the last first scan line S1[*k*] when the second scan driver 200 outputs a scan signal to the last second scan line S2[*n*]. That is, corresponding to the second mode, the first and second scan drivers 100 and 200 may simultaneously (e.g., concurrently) supply one or more scan signals (particularly, the current scan signal) respectively to the last first scan line S1[*k*] and the last second scan line S2[*n*].

Meanwhile, when the display device is driven in the second mode, the data driver 400 outputs data signals DS2[1] to DS2[*n*] corresponding to an effective image to be displayed in the second pixel region 604 at the time when the second scan driver 200 is driven during each frame period. The data signals DS2[1] to DS2[*n*] are supplied to the second pixel region 604, corresponding to a second scan signal supplied to each of the second scan lines S2[1] to S2[*n*]. Accordingly, an effective image corresponding to the data signals DS2[1] to DS2[*n*] is displayed in the second pixel region 604.

In an embodiment of the present disclosure, when the display device is driven in the second mode, some of the data signals DS2[1] to DS2[*n*] may be simultaneously (e.g., concurrently) supplied to the second and third pixel regions 604 and 606, or be simultaneously (e.g., concurrently) supplied to the first and second pixel regions 602 and 604. For example, when the display device is driven in the second mode, the same data signal DS2[1] may be supplied to second and third pixels PXL2 and PXL3 located on the first horizontal line of the second pixel region 604 and the first horizontal line of the third pixel region 606. In addition, the same data signal DS2[*n*] may be supplied to first and second pixels PXL1 and PXL2 located on the last horizontal line (i.e., a kth horizontal line) of the first pixel region 602 and the horizontal line of the second pixel region 604.

When the display device is driven in the second mode, the first to third scan drivers 100, 200, and 300 supply the first to third scan signals to the scan lines S1[1] to S1[*k*], S2[1] to S2[*n*], and S3[1] to S3[*j*] while repeating the above-described process. That is, when the display device is driven in the second mode, as shown in FIG. 10, the second lines S2[1] to S2[*n*] are sequentially driven during one frame period. In addition, the third scan lines S3[1] to S3[*j*] are sequentially driven during an initial first period in the period in which the second lines S2[1] to S2[*n*] are driven, and the first scan lines S1[1] to S1[*k*] are sequentially driven during a latter second period in the period in which the second lines S2[1] to S2[*n*] are driven.

Therefore, when the display device is driven in the second mode, an effective image may be displayed in the second pixel region 604 as shown in FIG. 11. In addition, dummy images of different regions in the effective image may be displayed in the first and third pixel regions 602 and 606, respectively. For example, a portion of the effective image displayed in a lower end region of the second pixel region 604 may be displayed in the first pixel region 602 located at the upper end of the second pixel region 604, and a portion of the effective image displayed in an upper end region of the second pixel region 604 may be displayed in the third pixel region 606 located at the lower end of the second pixel region 604.

In some embodiments, the second mode may be activated when the display device is mounted in the wearable electronic device 30. In this case, the first and third pixel regions 602 and 606 may be covered by the frame 31 of the wearable electronic device 30, etc., but the present disclosure is not limited thereto. For example, in another embodiment, the first and third pixel regions 602 and 606 are exposed to the user, and may be controlled such that the luminance of the first to third pixel regions 602 and 606 is very low to an extent close to black.

Meanwhile, in some embodiments, when the display device is driven in the second mode, the effective image displayed in the second pixel 604 may be divided into a plurality of images. When the display device is mounted and driven in the wearable electronic device 30 including the left-eye lens 21 and the right-eye lens 22 as shown in FIGS. 1A to 1C, the second pixel region 604 may be divided into a plurality of regions, corresponding to the respective left-eye and right-eye lens 21 and 22, and a predetermined effective image may be displayed in each of the divided regions.

For example, the second pixel region 604 may be divided into a plurality of regions to include a predetermined left-eye region 6041 in which a left-eye image is displayed and a predetermined right-eye region 6042 in which a right-eye image is displayed. In some embodiments, the second pixel region 604 may further include boundary regions 6043 located at the periphery of the left-eye region 6041 and the right-eye region 6042. For example, the boundary regions 6043 may be located between the left-eye region 6041 and the right-eye region 6042, between the left-eye region 6041 and the first pixel region 602, and the right-eye region 6042 and the third pixel region 606. In some embodiments, the boundary regions 6043 may not be viewed by the user as the boundary regions 6043 are covered by the frame 31, etc.

In some embodiments, when the display device is driven in the second mode, the boundary regions 6043 may display a black gray level. Alternatively, in another embodiment, the boundary regions 6043 may display a gray level that is gradually changed in a gradation form.

In some embodiments, when the display device is driven in the second mode, the data driver 400 may supply a data signal corresponding to the left-eye image, corresponding to the left-eye region 6041, and supply a data signal corresponding to the right-eye image, corresponding to the right-eye region 6042. In this case, at least a portion of the data signal corresponding to the left-eye image may be supplied to the third pixel region 606, and at least a portion of the data signal corresponding to the right-eye image may be supplied to the first pixel region 602. In addition, when the display device is driven in the second mode, the data driver 400 may supply a data signal corresponding to the black gray level to the boundary regions 6043. Accordingly, the data signal corresponding to the black gray level can be supplied to not only the boundary regions 6043 included in the second pixel region 604 but also boundary regions between the pixel regions 602, 604, and 606.

Meanwhile, in another embodiment of the present disclosure, the second pixel region 604 may be integrated as one visual region VDA without being divided into the left-eye region 6041 and the right-eye region 6042. In this case, the boundary regions 6043 may be located at boundaries between the pixel regions 602, 604, and 606.

According to the above-described embodiment, when the display device is driven in the second mode, a data signal corresponding to the black level (or gray level that is gradually changed in the gradation form) is supplied to the boundary regions between at least the pixel regions 602, 604, and 606. At this time, the same data signal as the last horizontal line of the second pixel region 604, e.g., the data signal of the black gray level can be supplied to the last horizontal line of the first pixel region 602. In addition, the same data signal as the first horizontal line of the second pixel region 604, e.g., the data signal of the black gray level can be supplied to the first horizontal line of the third pixel region 606.

Thus, according to the embodiment of the present disclosure, a sudden change in image does not occur in the boundary regions between the pixel regions 602, 604, and 606, so that the occurrence of image sticking at a boundary surface can be prevented. Further, the black gray level is displayed in the boundary region between the first and third pixel regions 602 and 606, so that it is possible to reduce and prevent light leakage interference that occurs as the first and third pixel regions 602 and 606 are driven.

In some embodiments, when the display device is driven in the second mode, the first and third pixel regions 602 and 606 may be controlled to display a luminance to an extent almost close to black as the emission time of the first and third pixel regions 602 and 606 is minimized. Accordingly, dummy images displayed in the first and third pixels regions 602 and 606 can be prevented from being recognized by the user, regardless of data signals supplied to the first and third pixel regions 602 and 606.

Figure 12:
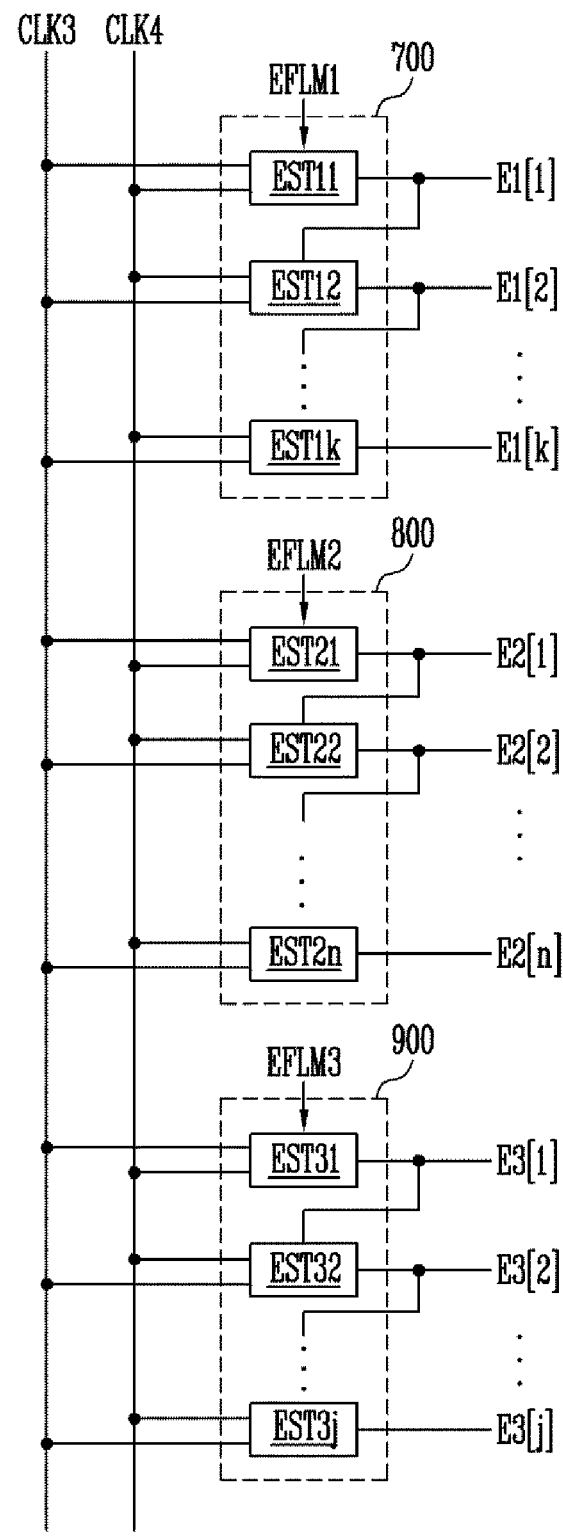
FIG. 12 illustrates an embodiment of emission control drivers shown in FIG. 3.

FIG. 12 illustrates an embodiment of the emission control drivers shown in FIG. 3. An embodiment in which the emission control drivers are driven by two clock signals is disclosed in FIG. 12, but the present disclosure is not limited thereto. That is, the number and/or kind of clock signals input to the emission control drivers may be variously changed.

Referring to FIG. 12, in some embodiments, the first emission control driver 700 includes a plurality of first emission control stages EST11 to EST1$k$ for driving the first emission control lines E1[1] to E1[$k$]. For example, an ith first emission control stage EST1$i$ may be coupled to an ith first emission control line E1[$i$], to supply a first emission control signal to the ith first emission control line E1[$i$].

In some embodiments, the first emission control stages EST11 to EST1$k$ may be supplied with a first emission start signal EFLM1 and third and fourth clock signals CLK3 and CLK4, and shift the first emission start signal EFLM1 by using the third and fourth clock signals CLK3 and CLK4. Accordingly, the first emission control driver 700 can sequentially supply the first emission control signal to the first emission control lines E1[1] to E1[$k$].

In some embodiments, the second emission control driver 800 includes a plurality of second emission control stages EST21 to EST2$n$ for driving the second emission control lines E2[1] to E2[$n$]. For example, an ith second emission control stage EST2$i$ may be coupled to an ith second emission control line E2[$i$], to supply a second emission control signal to the ith second emission control line E2[$i$].

In some embodiments, the second emission control stages EST21 to EST2$n$ may be supplied with a second emission start signal EFLM2 and third and fourth clock signals CLK3 and CLK4, and shift the second emission start signal EFLM2 by using the third and fourth clock signals CLK3 and CLK4. Accordingly, the second emission control driver 800 can sequentially supply the second emission control signal to the second emission control lines E2[1] to E2[$n$].

In some embodiments, the third emission control driver 900 includes a plurality of third emission control stages EST31 to EST3$j$ for driving the third emission control lines E3[1] to E3[$j$]. For example, an ith third emission control stage EST3$i$ may be coupled to an ith third emission control line E3[$i$], to supply a third emission control signal to the ith third emission control line E3[$i$].

In some embodiments, the third emission control stages EST31 to EST3$j$ may be supplied with a third emission start signal EFLM3 and third and fourth clock signals CLK3 and CLK4, and shift the third emission start signal EFLM3 by using the third and fourth clock signals CLK3 and CLK4. Accordingly, the third emission control driver 900 can sequentially supply the third emission control signal to the third emission control lines E3[1] to E3[$j$].

Here, the width of the first emission control signal may be determined corresponding to that of the first emission start signal EFLM1. In addition, the width of the second emission control signal may be determined corresponding to that of the second emission start signal EFLM2, and the width of the third emission control signal may be determined corresponding to that of the third emission start signal EFLM3. Thus, the widths of the first emission start signal EFLM1, the second emission start signal EFLM2, and the third emission start signal EFLM3 are controlled, so that the widths of the first emission control signal, the second emission control signal, and the third emission control signal can be controlled. That is, the widths of the first to third emission start signals EFLM1, EFLM2, and EFLM3 are controlled, so that the emission times of the first to third pixels PXL1, PXL2, and PXL3 can be independently controlled.

Meanwhile, in an embodiment of the present disclosure, the configuration of the emission control stages EST11 to EST1$k$, EST21 to EST2$n$, and EST31 to EST3$j$ is not particularly limited. That is, the emission control stages EST11 to EST1$k$, EST21 to EST2$n$, and EST31 to EST3$j$ may be implemented with various types of emission control circuits currently known in the art.

Figure 13:
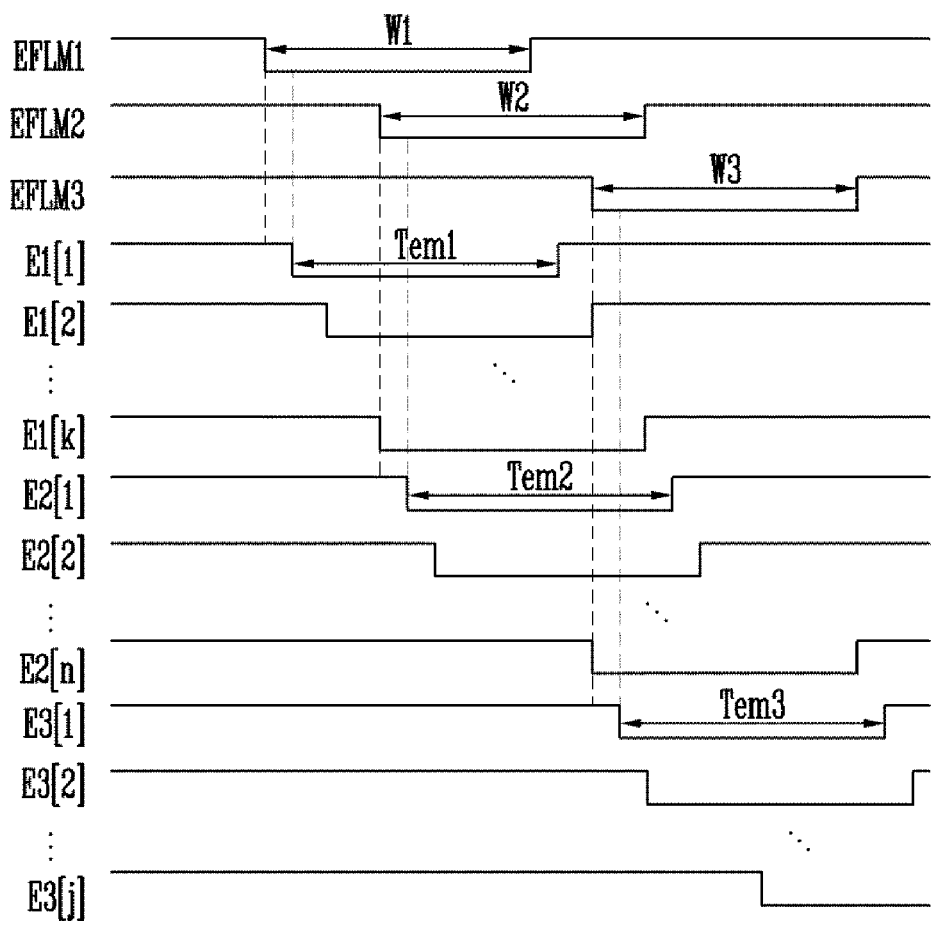
FIG. 13 illustrates an embodiment of driving timings of the emission control drivers when the display device shown in FIG. 3 is driven in the first mode.

FIG. 13 illustrates an embodiment of driving timings of the emission control drivers when the display device shown in FIG. 3 is driven in the first mode. In this case, the scan signals shown in FIG. 6 may be supplied to the scan lines.

Referring to FIG. 13, when the display device is driven in the first mode, the timing controller 500 sequentially supplies the first emission start signal EFLM1, the second emission start signal EFLM2, and the third emission start signal EFLM3 respectively to the first emission control driver 700, the second emission control driver 800, and the third emission control driver 900. Here, the supply timings of the first emission start signal EFLM1, the second emission start signal EFLM2, and the third emission start signal EFLM3 are set such that the first emission control signal, the second emission control signal, and the third emission control signal are sequentially supplied respectively to the first emission control lines E1[1] to E1[k], the second emission control lines E2[1] to E2[n], and the third emission control lines E3[1] to E3[j]. In addition, the widths and/or supply timings of the first emission start signal EFLM1, the second emission start signal EFLM2, and the third emission start signal EFLM3 may be set such that, during a period in which a scan signal is supplied to pixels PXL1, PXL2, and PXL3 of each horizontal line, the pixels PXL1, PXL2, and PXL3 of the corresponding horizontal line do not emit light.

In some embodiments, when the display device is driven in the first mode, the first to third emission start signals EFLM1, EFLM2, and EFLM3 may have the same width. For example, when the gate-on voltage sections of the first to third emission start signals EFLM1, EFLM2, and EFLM3 have a first width W1, a second width W2, and a third width W3, respectively, the first to third widths W1, W2, and W3 may be equal to one another.

If the first emission start signal EFLM1 is supplied, the first emission control driver 700 sequentially supplies the first emission control signal to the first emission control lines E1[1] to E1[k]. In this case, the first emission control signal having the gate-off voltage, which is supplied to an ith first emission control line E1[i], may be supplied to overlap with at least one first scan signal supplied to an ith first scan line S1[i].

If the second emission start signal EFLM2 is supplied, the second emission control driver 800 sequentially supplies the second emission control signal to the second emission control lines E2[1] to E2[n]. In this case, the second emission control signal having the gate-off voltage, which is supplied to an ith second emission control line E2[i], may be supplied to overlap with at least one second scan signal supplied to an ith second scan line S2[i].

If the third emission start signal EFLM3 is supplied, the third emission control driver 900 sequentially supplies the third emission control signal to the third emission control lines E3[1] to E3[j]. In this case, the third emission control signal having the gate-off voltage, which is supplied to an ith third emission control line E3[i], may be supplied to overlap with at least one third scan signal supplied to an ith third scan line S3[i].

When the display device is driven in the first mode, the first to third emission control drivers 700, 800, and 900 repeat the above-described process. That is, when the display device is driven in the first mode, the first to third emission control drivers 700, 800, and 900 sequentially drive the first to third emission control lines E1[1] to E1[k], E2[1] to E2[n], and E3[1] to E3[j] in an order of the first pixel region 602, the second pixel region 604, and the third pixel region 606.

At this time, corresponding to the first mode, the first to third emission control drivers 700, 800, and 900 control the first to third pixels PXL1, PXL2, and PXL3 to emit light during the substantially same time. For example, the first to third emission control drivers 700, 800, and 900 may control the first to third emission control lines E1[1] to E1[k], E2[1] to E2[n], and E3[1] to E3[j] to have the gate on voltage during first, second, and third times Tem1, Tem2, and Tem3 in one frame period, and the first to third times Tem1, Tem2, and Tem3 may be set equal to one another.

Figure 14:
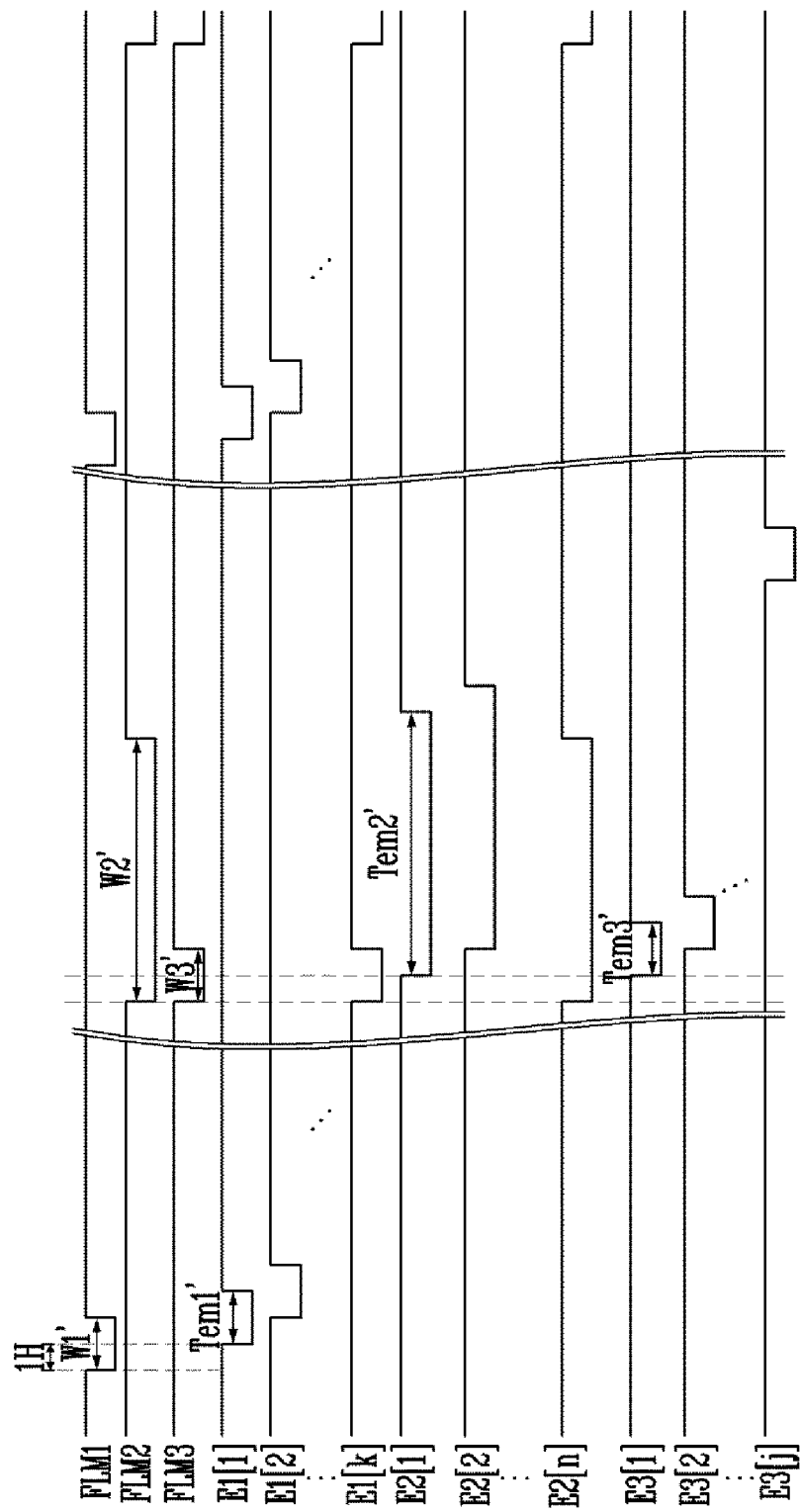
FIG. 14 illustrates an embodiment of driving timings of the emission control drivers when the display device shown in FIG. 3 is driven in the second mode.

FIG. 14 illustrates an embodiment of driving timings of the emission control drivers when the display device shown in FIG. 3 is driven in the second mode. In this case, the scan signals shown in FIG. 9 may be supplied to the scan lines.

Referring to FIG. 14, when the display device is driven in the second mode, the timing controller 500 supplies, in a predetermined order, the first emission start signal EFLM1, the second emission start signal EFLM2, and the third emission start signal EFLM3 respectively to the first emission control driver 700, the second emission control driver 800, and the third emission control driver 900. For example, corresponding to the second mode, the timing controller 500 may supply the first to third emission start signals EFLM1, EFLM2, and EFLM3 during periods in which the respective pixel regions 602, 604, and 606 are scanned such that the first to third emission control drivers 700, 800, and 900 respectively output the first to third emission control signals having the gate-off voltage during a period in which a corresponding horizontal line is scanned.

In some embodiments, when the display device is driven in the second mode, the emission time Tem2' of each of the second pixels PXL2 may be set longer than the emission times Tem1' and Tem3' of each of the first and third pixels PXL1 and PXL3 during each frame period. For example, when assuming that the first and third pixels PXL1 and PXL3 emit light during a first time in one frame period, the second pixels PXL2 may emit light during a second time longer than the first time in the one frame period.

In some embodiments, when the display device is driven in the second mode, the emission times Tem1' and Tem3' of each of the first and third pixels PXL1 and PXL3 may be set equal to each other, and the emission time Tem2' of each of the second pixels PXL2 may be set sufficiently long to satisfy a desired luminance characteristic. For example, during the period in which the display device is driven in the second mode, the on ratio of the first and third pixels PXL1 and PXL3 (e.g., the ratio of sections set to emission periods in one frame period) may be minimally set to about 1%, and the on ratio of the second pixels PXL may be set to about 20% to about 30%.

To this end, the second emission start signal EFLM2 may have a width different from those of the first and third emission start signals EFLM1 and EFLM3. For example, when assuming that the gate-on voltage sections of the first, second, and third emission start signals EFLM1, EFLM2, and EFLM3 have a first width W1', a second width W2', and a third width W3', respectively, the second width W2' may be wider than the first width W1' and the third width W3'. Meanwhile, in some embodiments, the first width W1' and the third width W3' may be equal to each other, but the present disclosure is not limited thereto. That is, in another embodiment, the first width W1' and the third width W3' may be different from each other.

In some embodiments, the emission times Tem1' and Tem3' of each of the first and third pixels PXL1 and PXL3 may be set short to an extent where the first and third pixel regions 602 and 603 can display a luminance almost close to the black gray level regardless of data signals. That is, the widths of the first and third emission start signals EFLM1 and EFLM3 are controlled corresponding to the second mode, so that the emission times of the first and third pixel regions 602 and 606 can be minimized. Thus, in the second mode, the luminance of the remaining display region except the effective display region can be lowered in a lump.

Accordingly, when the display device is driven in the second mode, it is possible to prevent dummy images displayed in the first and third pixel regions 602 and 606 from being actually recognized by the user or prevent a light leakage phenomenon from occurring in the first and third pixel regions 602 and 606 even when the first and third pixels PXL1 and PXL3 are driven.

Figure 15:
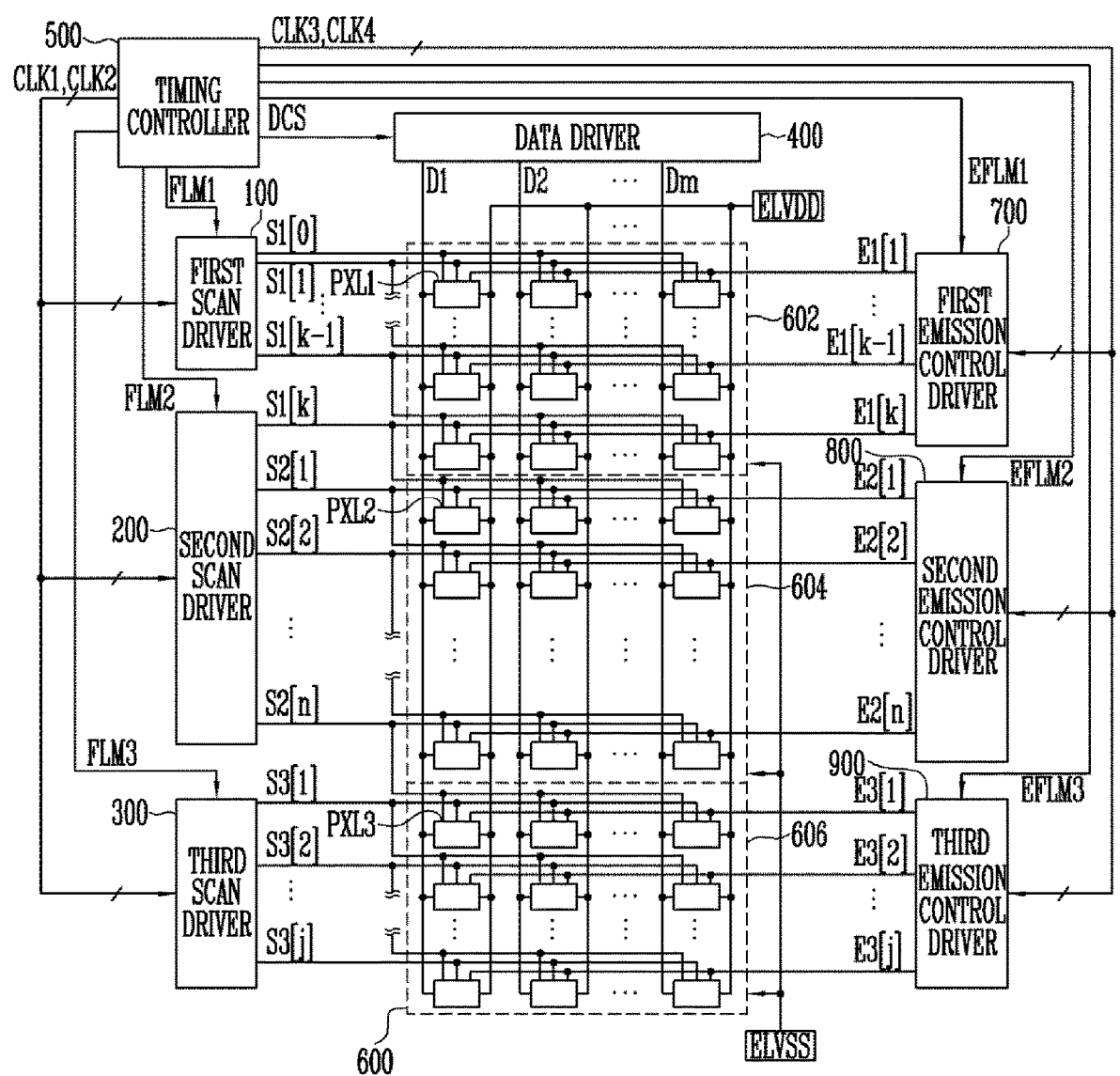
FIG. 15 illustrates a display device according to some example embodiments of the present disclosure.

FIG. 15 illustrates a display device according to another embodiment of the present disclosure. In FIG. 15, components similar or identical to those of FIG. 3 are designated by like reference numerals, and descriptions overlapping with those of the embodiment of FIG. 3 will be omitted.

Referring to FIG. 15, each of the pixels PXL1, PXL2, and PXL3 may be further coupled to at least another scan line (one of S1[0], S1[1] to S1[k], S2[1] to S2[n], and S3[1] to S3[j]) in addition to a current scan line (any one of S1[1] to S1[k], S2[1] to S2[n], and S3[1] to S3[j]) on a corresponding horizontal line. For example, pixels PXL1, PXL2, or PXL arranged on an ith horizontal line of each of the pixel regions 602, 604, and 606 may be coupled to an (i−1)th scan line S1[i−1], S2[i−1], or S3[i−1] in addition to an ith scan line S1[i], S2[i], or S3[i].

Meanwhile, first scan lines S2[1] and S3[1] of the second and third pixel regions 604 and 606 may be coupled to the last scan lines S1[k] and S2[n] of the first and second pixel regions 602 and 604, respectively. In addition, the first scan line S1[1] of the first pixel region 602 may be coupled to a zeroth scan line S1[0]. In some embodiments, the zeroth scan line S1[0] may be additionally provided at an upper end of the first pixel region 602.

Each of the pixels PXL1, PXL2, and PXL3 may be initialized corresponding to a scan signal supplied to the zeroth scan line S1[0] or a current scan line of any one of previous scan lines (e.g., a scan line of the just previous scan line). For example, second pixels PXL2 provided on the first horizontal line of the second pixel region 604 may be coupled to any one of the first scan lines S1[1] to S1[k], e.g., a kth first scan line S1[k] provided on the last horizontal line of the first pixel region 602, to be initialized corresponding to the first scan signal supplied to the kth first scan line S1[k].

In the above-described embodiment, the first scan driver 100 may include scan stages for driving the zeroth scan line S1[0] and the first to (k−1)th first scan lines S1[1] to S1[k−1], and the second scan driver 200 may include scan stages for driving the kth first scan line S1[k] and the first to nth second scan lines S2[1] to S2[n]. In addition, the third scan driver 300 may include scan stages for driving the first to jth third scan lines S3[1] to S3[j].

Meanwhile, like the above-described embodiment, the first to third emission control drivers 700, 800, and 900 may be configured to independently control emission times of the pixel regions 602, 604, and 606. For example, the first emission control driver 700 may sequentially drive the first to kth first emission control lines E1[1] to E1[k], corresponding to the first emission start signal EFLM1, and the second emission control driver 800 may sequentially drive the first to nth second emission control lines E2[1] to E2[n], corresponding to the second emission control signal EFLM2. In addition, the third emission control driver 900 may sequentially drive the first to jth third emission control lines E3[1] to E3[j], corresponding to the third emission start signal EFLM3.

Figure 16:
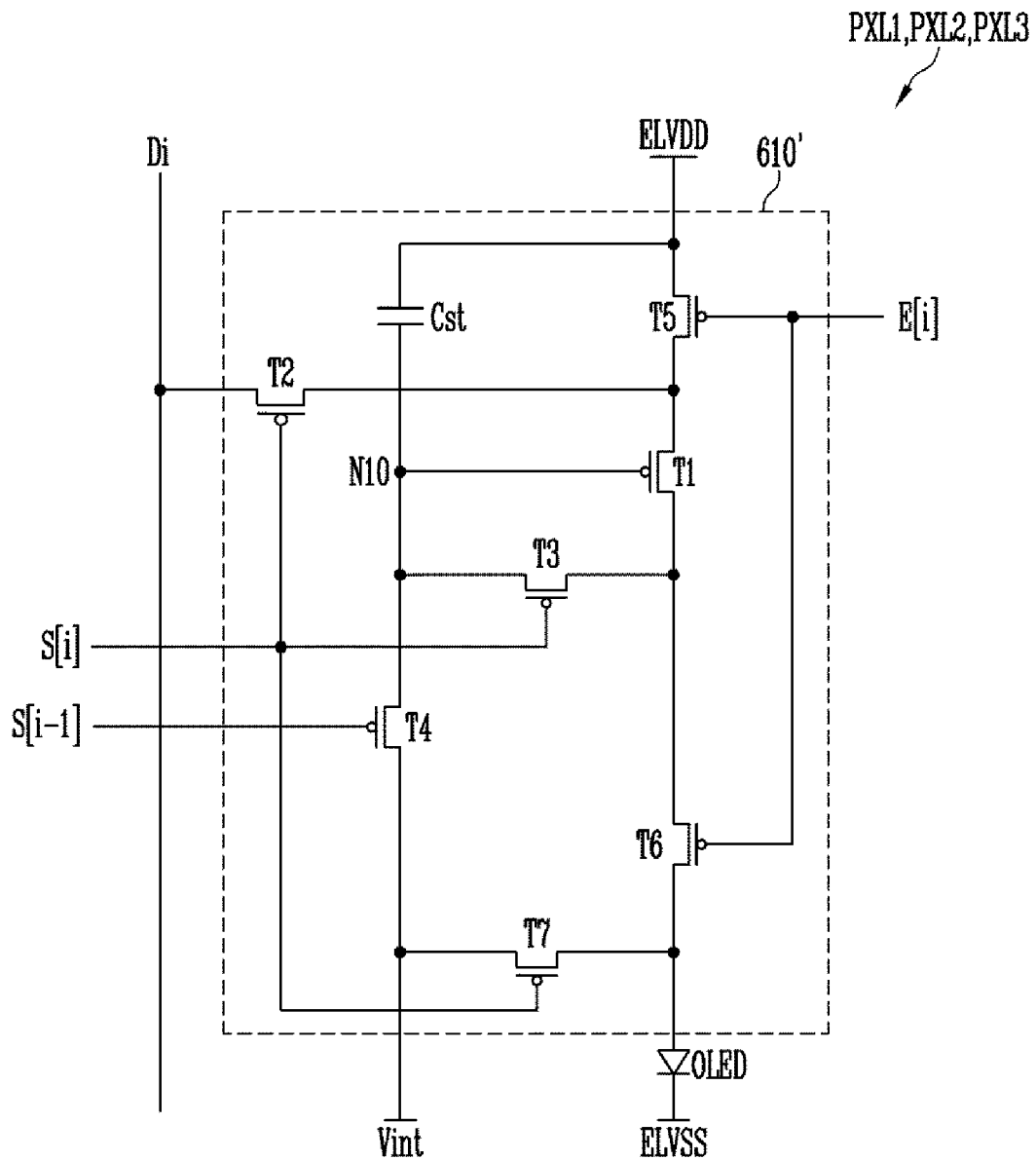
FIG. 16 illustrates an embodiment of a pixel shown in FIG. 15.

FIG. 16 illustrates an embodiment of the pixel shown in FIG. 15. For convenience, a pixel (any one of the first to third pixels) coupled with an ith data line and an ith scan line (any one of the first to third scan lines) is illustrated in FIG. 16.

Referring to FIG. 16, the pixel PXL1, PXL2, or PXL3 according to the embodiment of the present disclosure includes an organic light emitting diode OLED and a pixel circuit 610'.

An anode electrode of the organic light emitting diode OLED is coupled to the pixel circuit 610', and a cathode electrode of the organic light emitting diode OLED is coupled to the second power source ELVSS. The organic light emitting diode OLED generates light with a predetermined luminance corresponding to a driving current supplied from the pixel circuit 610'.

The pixel circuit 610' controls a driving current flowing from the first power source ELVDD to the second power source ELVSS via the organic light emitting diode OLED, corresponding to a data signal. To this end, the pixel circuit 610 includes first to seventh transistors T1 to T7 and a storage capacitor Cst.

A first electrode of the first transistor (driving transistor) T1 is coupled to the first power source ELVDD via the fifth transistor T5, and a second electrode of the second transistor T1 is coupled to the organic light emitting diode OLED via the sixth transistor T6. In addition, a gate electrode of the first transistor T1 is coupled to a tenth node N10. The first transistor T1 controls a driving current flowing from the first power source ELVDD to the second power source ELVSS via the organic light emitting diode OLED, corresponding to a voltage of the tenth node N10.

The second transistor (switching transistor) T2 is coupled between a data line Di and the first electrode of the first transistor T1. In addition, a gate electrode of the second transistor T2 is coupled to an ith scan line (current scan line) S[i]. The second transistor T2 is turned on when a scan signal is supplied to the ith scan line S[i], to allow the data line Di and the first electrode of the first transistor T1 to be electrically coupled to each other.

The third transistor (threshold voltage compensation transistor) T3 is coupled between the second electrode of the first transistor T1 and the tenth node N10. In addition, a gate electrode of the third transistor T3 is coupled to the ith scan line S[i]. The third transistor T3 is turned on when the scan signal is supplied to the ith scan line S[i], to allow the second electrode of the first transistor T1 and the tenth node N10 to be electrically coupled to each other. If the third transistor T3 is turned on, the first transistor T1 is diode-coupled.

The fourth transistor (first initialization transistor) T4 is coupled between the tenth node N10 and an initialization power source Vint. In addition, a gate electrode of the fourth transistor T4 is coupled to an (i−1)th scan line (previous scan line) S[i−1]. The fourth transistor T4 is turned on when a scan signal is supplied to the (i−1)th scan line S[i−1], to supply the voltage of the initialization power source Vint to the tenth node N10.

The fifth transistor (first emission control transistor) T5 is coupled between the first power source ELVDD and the first transistor. In addition, a gate electrode of the fifth transistor T5 is coupled to an emission control line E[i]. The fifth transistor T5 is turned off when an emission control signal having the gate-off voltage is supplied to the emission control line E[i], and is turned on otherwise.

The sixth transistor (second emission control transistor) T6 is coupled between the first transistor T1 and the organic light emitting diode OLED. In addition, a gate electrode of the sixth transistor T6 is coupled to the emission control line E[i]. The sixth transistor T6 is turned off when the emission control signal having the gate-off voltage is supplied to the emission control line E[i], and is turned on otherwise.

The seventh transistor (second initialization transistor) T7 is coupled between the initialization power source Vint and the anode electrode of the organic light emitting diode OLED. In addition, a gate electrode of the seventh transistor T7 is coupled to the ith scan line S[i]. The seventh transistor T7 is turned on when the scan signal is supplied to the ith scan line S[i], to supply the voltage of the initialization power source Vint to the anode electrode of the organic light emitting diode OLED. Here, the initialization power source Vint may be set to a voltage equal to or smaller than the lowest voltage of the data signal. Meanwhile, the gate electrode of the seventh transistor T7 may be coupled to another scan line instead of the ith scan line S[i]. For example, in another embodiment, the gate electrode of the seventh transistor T7 may be coupled to an (i+1)th scan line S[i+1]. In this case, the seventh transistor T7 may be turned on when a scan signal is supplied to the (i+1)th scan line S[i+1], to supply the voltage of the initialization power source Vint to the anode electrode of the organic light emitting diode OLED.

The storage capacitor Cst is coupled between the first power source ELVDD and the tenth node N10. The storage capacitor Cst stores a voltage corresponding to the data signal and a threshold voltage of the first transistor T1.

Figure 17:
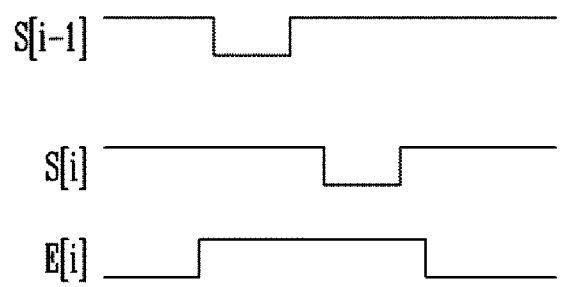
FIG. 17 illustrates an embodiment of a driving timing of the pixel shown in FIG. 16.

FIG. 17 illustrates an embodiment of a driving timing of the pixel shown in FIG. 16.

Referring to FIG. 17, first, the emission control signal having the gate-off voltage is supplied to the emission control line E[i]. Accordingly, the fifth transistor T5 and the sixth transistor T6 are turned off. If the fifth transistor T5 and the sixth transistor T6 are turned off, the current path of the driving current is blocked, and therefore, the pixel PXL1, PXL2, or PXL3 is set to a non-emission state.

After that, as the scan signal is supplied to the (i−1)th scan line S[i−1], the fourth transistor T4 is turned on. If the fourth transistor T4 is turned on, the voltage of the initialization power source Vint is supplied to the tenth node N10. Then, the tenth node N10 is initialized to the voltage of the initialization power source Vint.

After the tenth node N10 is initialized to the voltage of the initialization power source Vint, the scan signal is supplied to the ith scan line S[i]. If the scan signal is supplied to the ith scan line S[i], the second transistor T2, the third transistor T3, and the seventh transistor T7 are turned on.

If the seventh transistor T7 is turned on, the voltage of the initialization power source Vint is supplied to the anode electrode of the organic light emitting diode OLED. Then, a parasitic capacitor parasitically formed in the organic light emitting diode OLED is discharged, and accordingly, the ability of expressing a black gray level can be improved.

If the third transistor T3 is turned on, the first transistor T1 is diode-coupled.

If the second transistor T2 is turned on, the data signal from the data line Di is supplied to the first electrode of the first transistor T1. At this time, because the tenth node N10 is initialized to the voltage of the initialization power source Vint, which is lower than that of the data signal, the first transistor T1 is turned on.

If the first transistor T1 is turned on, a voltage obtained by subtracting the threshold voltage of the first transistor T1 from the data signal is applied to the tenth node N10. At this time, the storage capacitor Cst stores a voltage corresponding to the data signal applied to the tenth node N10 and the threshold voltage of the first transistor T1.

After the voltage corresponding to the data signal and the threshold voltage of the first transistor T1 is stored in the storage capacitor Cst, the supply of the emission control signal having the gate-off voltage is stopped. In this case, the gate-on voltage may be applied to the emission control line E[i].

If the gate-on voltage is applied to the emission control line E[i], the fifth transistor T5 and the sixth transistor T6 are turned on. Accordingly, there is formed a current path from the first power source ELVDD to the second power source ELVSS via the fifth transistor T5, the first transistor T1, the sixth transistor T6, and the organic light emitting diode OLED. At this time, the first transistor T1 controls the amount of driving current flowing from the first power source ELVDD to the second power source ELVSS via the organic light emitting diode OLED, corresponding to the voltage of the tenth node N10. Then, the organic light emitting diode OLED emits light with a luminance corresponding to the amount of the driving current supplied from the first transistor T1.

The pixel PXL1, PXL2, or PXL3 generates light with a luminance corresponding to the data signal while repeating the above-described process. Additionally, in the embodiment of the present disclosure, the circuit structure of the pixel PXL1, PXL2, or PXL3 is not limited by FIG. 16, and may be implemented in various forms currently known in the art.

The emission control signal having the gate-off voltage, which is supplied to the emission control line E[i], is supplied to overlap with at least one scan signal such that the pixel PXL1, PXL2, or PXL3 is set to the non-emission state during the period in which the data signal is charged in the pixel PXL1, PXL2, or PXL3. For example, the emission control signal having the gate-off voltage may overlap with at least the current scan line (i.e., the ith scan line S[i]). In addition, the emission control signal having the gate-off voltage may also overlap with the previous scan line (i.e., the (i−1)th scan line S[i−1]).

In some embodiments, when a plurality of scan signals are supplied to each of the scan lines S1[1] to S1[k], S2[1] to S2[n], and S3[1] to S3[j] during one frame period, the emission control signal having the gate-off voltage may overlap with a plurality of scan signals supplied to scan lines (consecutive two of S1[1] to S1[k], S2[1] to S2[n], and S3[1] to S3[j]) on a corresponding horizontal line and a previous horizontal line. As described above, the supply timing of the emission control signal may be set in various manners currently known in the art.

Figure 18:
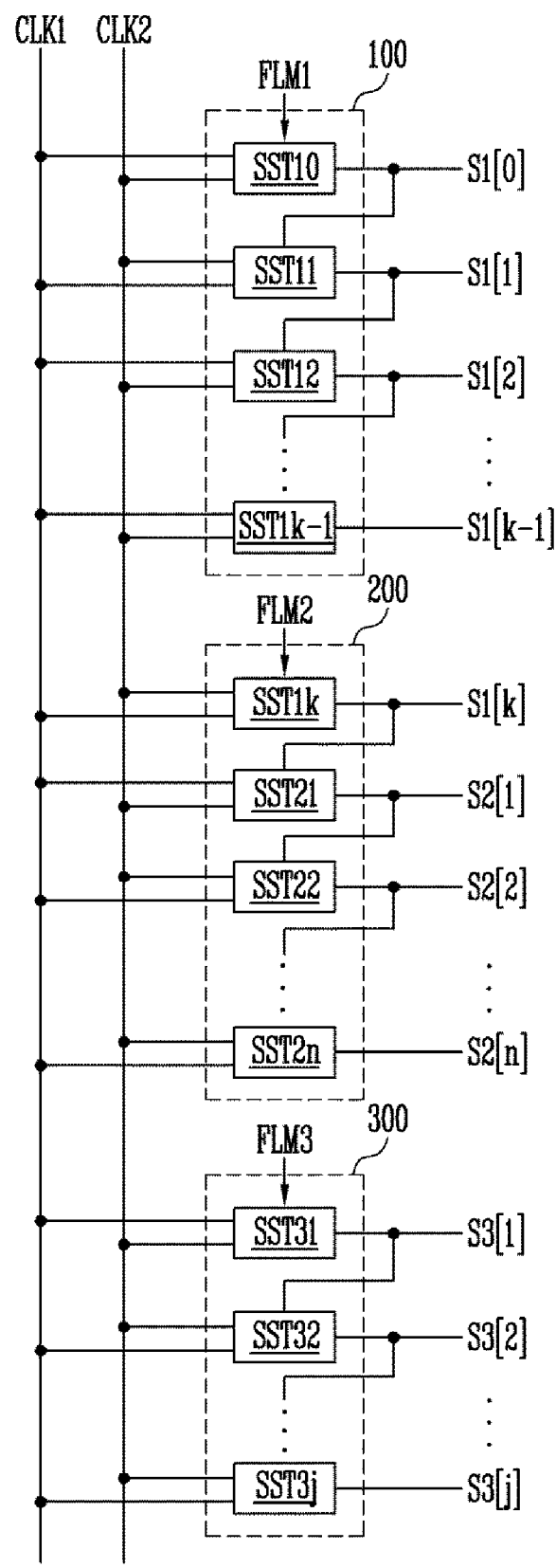
FIG. 18 illustrates an embodiment of scan drivers shown in FIG. 15.

FIG. 18 illustrates an embodiment of the scan drivers shown in FIG. 15. In FIG. 18, components similar or identical to those of FIG. 5 are designated by like reference numerals, and descriptions overlapping with those of the embodiment of FIG. 5 will be omitted.

Referring to FIG. 18, in some embodiments, the first scan driver 100 further includes at least one first scan stage SST10 for driving the zeroth scan line S[0]. That is, the first scan driver 100 further include at least one first scan state SST10 for initializing the first pixels PXL1 provided on the first horizontal line of the first pixel region 602. For example, the first scan driver 100 may include k first scan stages SST10 to SST1k−1 for driving the zeroth scan line S[0] and the first to (k−1)th first scan lines S1[1] to S1[k−1].

In this case, the first start signal FLM1 may be supplied to the first scan stage SST10 for driving the zeroth scan line S1[0]. Then, the first scan driver 100 sequentially supplies a scan signal to the zeroth scan line S[0] and the first to (k−1)th first scan lines S1[1] to S1[k−1].

In some embodiments, the second scan driver 200 includes a plurality of scan stages SST1k and SST21 to SST2n for driving the second pixels PXL2 provided in the second pixel region 604. For example, when the second pixels PXL2 provided on the first horizontal line of the second pixel region 604 is initialized by being coupled to any one of the first scan lines S1[1] to S1[k1] provided in the first pixel region 602, e.g., the last kth first scan line S1[k], the second scan driver 200 may additionally include a first scan stage SST11 for driving the kth first scan line S1[k]. That is, in some embodiments, the second scan driver 200 may include a first scan stage for driving the kth first scan line S1[k] and second scan stages SST21 to SST2n for driving the first to last nth second scan lines S2[1] to S2[n].

In this case, the second start signal FLM2 may be supplied to the first scan stage SST1k for driving the last scan line of the first pixel region 602, i.e., the kth first scan line S1[k]. Then, the second scan driver 200 sequentially supplies a scan signal to the kth first scan line S1[k] and the first to nth second scan lines S2[1] to S2[n].

Meanwhile, in another embodiment, when each of the second pixels PXL2 provided on the first horizontal line of the second pixel region 604 is coupled to another first scan line, e.g., uth (u is a natural number smaller than k) first scan line S1[u] instead of the last kth first scan line S1[k] of the first pixel region 602, the second scan driver 200 may include first scan stages SST1u to SST1k for driving the uth to kth first scan lines S1[u] to S1[k] and second scan stages SST21 to SST2n for driving the first to nth second scan lines S2[1] to S2[n]. In this case, the second start signal FLM2 may be supplied to the uth first scan stage SST1u.

The third scan driver 300, as described in the embodiment of FIG. 5, may include a plurality of third scan stages SST31 to SST3j for driving the first to last jth third scan lines S3[1] to S3[j]. The third scan driver 300 sequentially supplies a third scan signal to the third scan lines S3[1] to S3[j].

According to the above-described embodiment, even when the second pixel region 604 is driven under a condition different from those of the first and third pixel regions 602 and 606 during the period in which the display device is driven in the second mode, the initialization condition of the second pixels PXL2 are uniformalized, thereby improving the image quality of the display device. For example, like the embodiment described in FIG. 9, even when the second pixel region 604 is driven at MC 7.0 CLK and the first and third pixel regions 602 and 606 are driven at MC 1.0 CLK during the period in which the display device is driven in the second mode, the initialization condition (or initialization period) of the second pixels PXL2 provided on the first horizontal line of the second pixel region 604 may be set to MC 7.0 CLK equal to that of the second pixels PXL2 on the other horizontal lines. Thus, it is possible to prevent the occurrence of a luminance difference between the second pixels PXL2 located at the upper end region of the second pixel region 604, e.g., the second pixels PXL2 located on the first and second horizontal lines. Accordingly, it is possible to prevent deterioration of image quality such as a lateral line generated in the effective display region.

Figure 19:
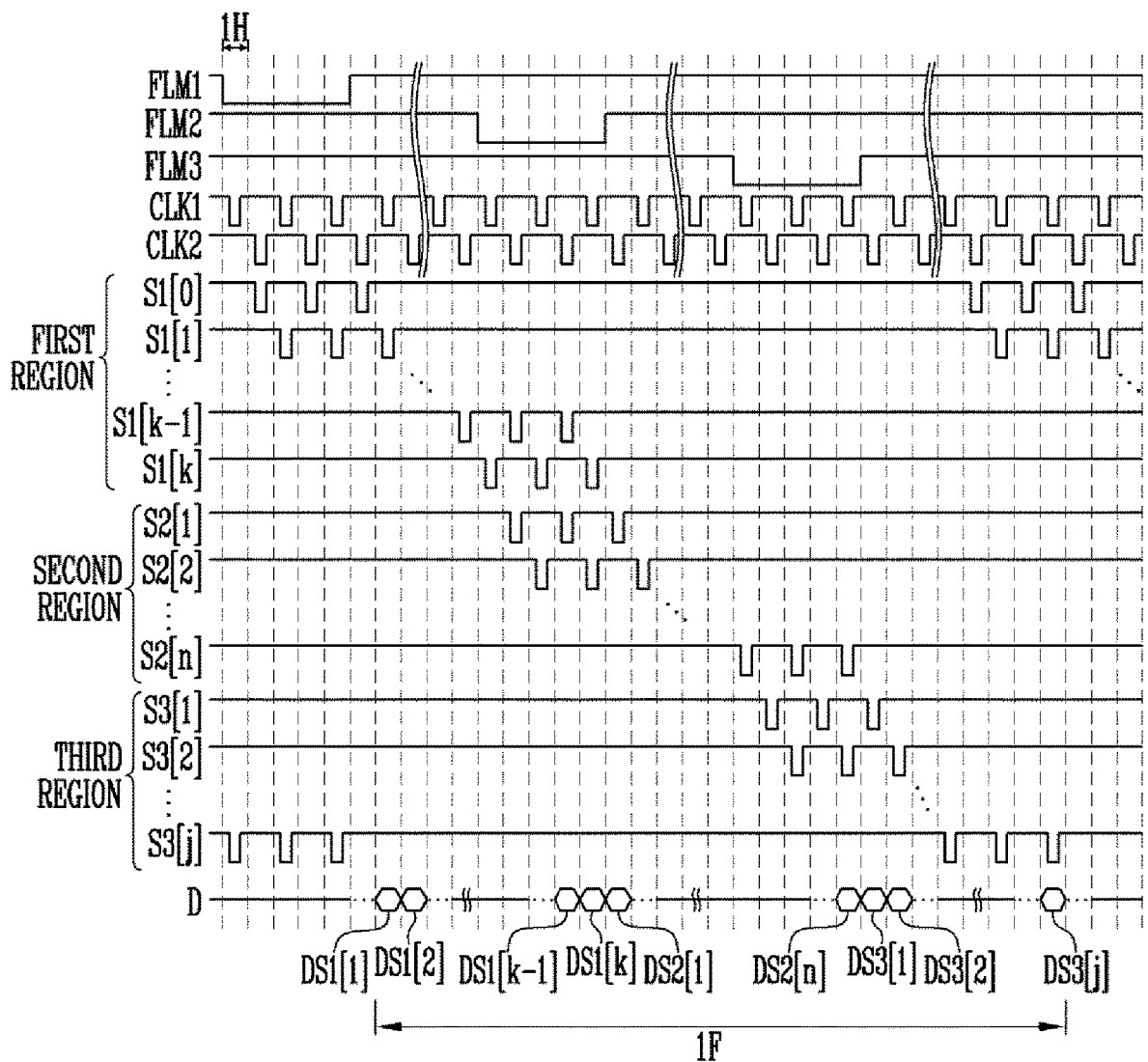
FIG. 19 illustrates an embodiment of driving timings of the scan drivers when the display device shown in FIG. 15 is driven in the first mode.
Figure 20:
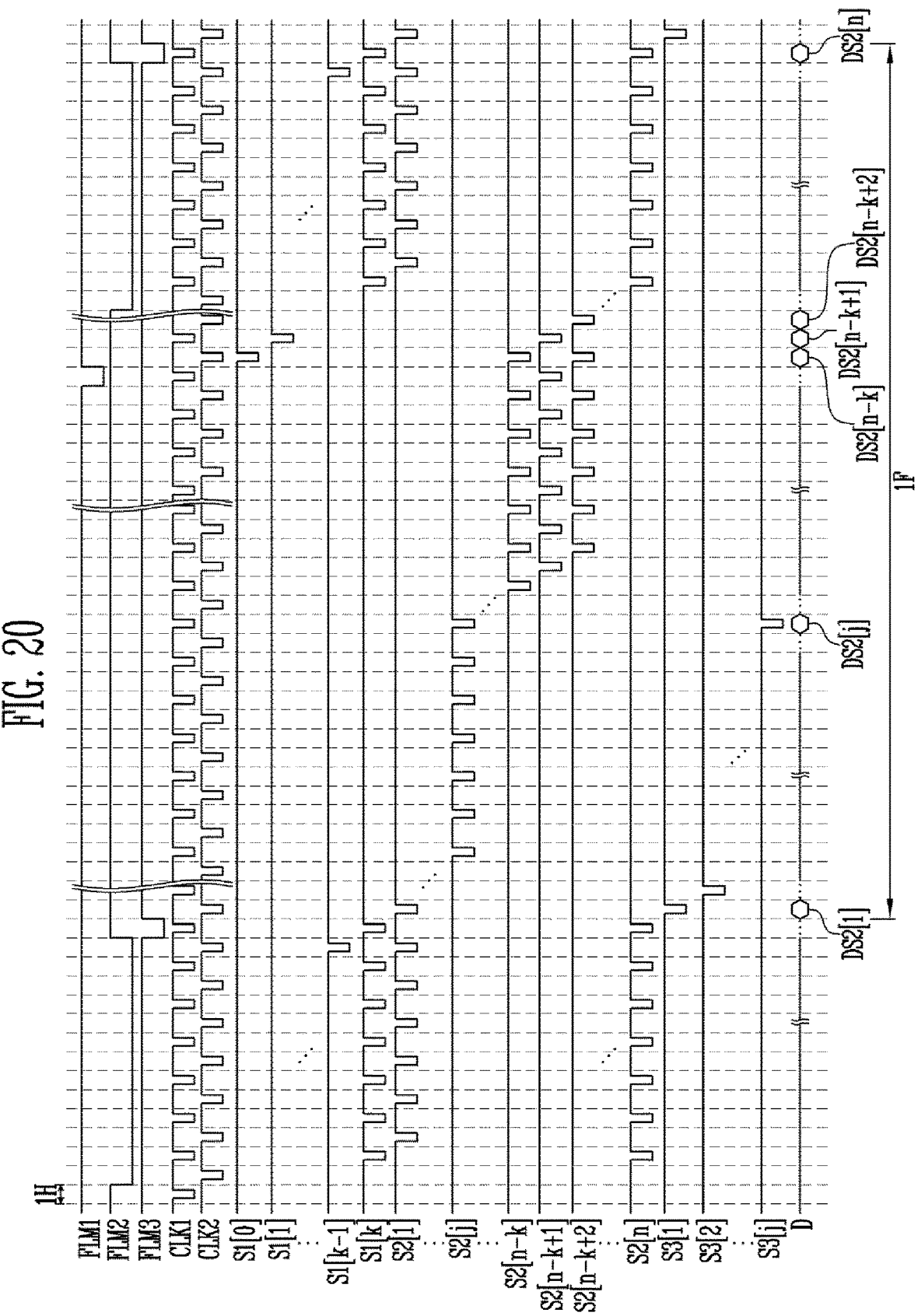
FIG. 20 illustrates an embodiment of driving timings of the scan drivers when the display device shown in FIG. 15 is driven in the second mode.

FIG. 19 illustrates an embodiment of driving timings of the scan drivers when the display device shown in FIG. 15 is driven in the first mode. FIG. 20 illustrates an embodiment of driving timings of the scan drivers when the display device shown in FIG. 15 is driven in the second mode. In FIGS. 19 and 20, components similar or identical to those of FIGS. 6 and 9 are designated by like reference numerals, and descriptions overlapping with those of the above-described embodiments will be omitted.

Referring to FIG. 19, when the display device is driven in the first mode, the first, second, and third start signals FLM1, FLM2, and FLM3 are respectively supplied to the first, second, and third scan drivers 100, 200, and 300 such that the first to third pixel regions 602, 604, and 606 are sequentially scanned during each frame period. In some embodiments, the first, second, and third start signals FLM1, FLM2, and FLM3 may have the same width during the period in which the display device is driven in the first mode.

If the first start signal FLM1 is supplied to the first scan driver 100, a scan signal is sequentially supplied to the zeroth scan line S1[0] and the first to (k−1)th first scan lines S1[1] to S1[k−1]. In this case, scan signals of which number corresponds to the width of the first start signal FLM1, e.g., three first scan signals may be supplied to each of the zeroth scan line S1[0] and the first to (k−1)th first scan lines S1[1] to S1[k−1].

If the second start signal FLM2 is supplied to the second scan driver 200, a scan signal is sequentially supplied to the kth first scan line S1[k] and the first to nth second scan lines S2[1] to S2[n]. In this case, scan signals of which number corresponds to the width of the second start signal FLM2, e.g., three first or second scan signals may be supplied to each of the kth first scan line S1[k] and the first to nth second scan lines S2[1] to S2[n].

If the third start signal FLM3 is supplied to the third scan driver 300, a scan signal is sequentially supplied to the first to jth third scan lines S3[1] to S3[j]. In this case, scan signals of which number corresponds to the width of the third start signal FLM3, e.g., three third scan signals may be supplied to each of the first to jth third scan lines S3[1] to S3[j].

Meanwhile, referring to FIG. 20, when the display device is driven in the second mode, the first, second, and third start signals FLM1, FLM2, and FLM3 are respectively supplied to the first, second, and third scan drivers 100, 200, and 300 such that the first to third pixel regions 602, 604, and 606 are scanned in a predetermined order during each frame period. For example, the first, second, and third start signals FLM1, FLM2, and FLM3 may be supplied such that the first and third pixel regions 602 and 606 are respectively scanned during different partial periods in the period in which the second pixel region 604 is scanned.

In some embodiments, when the display device is driven in the second mode, the first start signal FLM1, the second start signal FLM2, and/or the third start signal FLM3 may have different widths. For example, the width of the second start signal FLM2 may be set wider by two horizontal periods 2H than those of the first and third start signals FLM1 and FLM3.

If the first start signal FLM1 is supplied to the first scan driver 100, a scan signal is sequentially supplied to the zeroth scan line S1[0] and the first to (k−1)th first scan lines S1[1] to S1[k−1]. In this case, scan signals of which number corresponds to the width of the first start signal FLM1, e.g., one scan signal may be supplied to each of the zeroth scan line S1[0] and the first to (k−1)th first scan lines S1[1] to S1[k−1].

If the second start signal FLM2 is supplied to the second scan driver 200, a scan signal is sequentially supplied to the kth first scan line S1[k] and the first to nth second scan lines S2[1] to S2[n]. In this case, scan signals of which number corresponds to the width of the second start signal FLM2, e.g., seven scan signals may be supplied to each of the kth first scan line S1[k] and the first to nth second scan lines S2[1] to S2[n].

If the third start signal FLM3 is supplied to the third scan driver 300, a scan signal is sequentially supplied to the first to jth third scan lines S3[1] to S3[j]. In this case, scan signals of which number corresponds to the width of the third start signal FLM3, e.g., one scan signal may be supplied to each of the first to jth third scan lines S3[1] to S3[j].

According to the above-described embodiments of the present disclosure with reference to FIGS. 1 to 20, the display device includes at least two pixel regions, e.g., the first and second pixel regions AA1 and AA2 or 602 and 604, and displays effective images in different regions, corresponding to the first and second modes. For example, the display device may display an effective image in the first and second pixel regions AA1 and AA2 or 602 and 604, corresponding to the first mode, and display an effective image in only the second pixel region AA2 or 604, corresponding to the second mode. Also, in some embodiments, the display device may additionally include at least another pixel region, e.g., the third pixel region AA3 or 606. In some embodiment, like the first pixel region AA1 or 602, the third pixel region AA3 or 606 may display an effective image in only the first mode. As described above, a plurality of display modes are provided, so that the utilization of the display device can be improved.

Further, according to the embodiments of the present disclosure, the display device includes the scan drivers 100, 200, and 300 and/or the emission control drivers 700, 800, and 900, which correspond to the respective pixel regions AA1, AA2, and AA3 or 602, 604, and 606, and supplies the start signals FLM1, FLM2, FLM3, EFLM1, EFLM2, and EFLM3 respectively to the scan drivers 100, 200, and 300 and/or the emission control drivers 700, 800, and 900. Accordingly, the pixel regions AA1, AA2, and AA3 or 602, 604, and 606 can be independently driven without considerably changing the structures of the scan drivers 100, 200, and 300 and/or the emission control drivers 700, 800, and 900. In addition, any dummy circuit and the like are not added, and thus an increase in the peripheral region NA can be minimized.

Further, according to the embodiments of the present disclosure, the display device sequentially drives the first to third pixel regions AA1, AA2, and AA3 or 602, 604, and 606, corresponding to the first mode. Also, the display device sequentially drives a predetermined effective display region, e.g., the second pixel region AA2 or 604, corresponding to the second mode, and drives the first and third pixel regions AA1 and AA3 or 602 and 606 during at least a partial period in the period in which the second pixel region AA2 or 604 is driven. Accordingly, when the display device is driven in the second mode, a time (1H) necessary for high-speed driving of the second pixel region AA2 or 604 can be sufficiently secured, and the occurrence of characteristic differences between the pixel regions AA1, AA2, and AA3 or 602, 604, and 606 can be prevented.

Further, according to the embodiments of the present disclosure, when the display device is driven in the first mode and/or the second mode, a plurality of scan signals are supplied to each of the pixels PXL1, PXL2, and/or PXL3 of an effective display region (e.g., the first to third pixel regions AA1, AA2, and AA3 or 602, 604, and 606, or the second pixel region AA2 or 604) corresponding to each mode during each frame period. Accordingly, the response speed of the pixels provided in the effective display region can be improved.

Further, according to the embodiments of the present disclosure, when the display device is driven in the second mode, the display device is driven such that the number of scan signals supplied the pixels (e.g., the first and third pixels PXL1 and PXL3) of the remaining display region (e.g., the first and third regions AA1 and AA3 or 602 and 606) except the effective display region (e.g., the second pixel region AA2 or 604) during one frame period is smaller than that of scan signals supplied to the pixels (e.g., the second pixels PXL2) of the effective display region (e.g., the second pixel region AA2 or 604) during the one frame period. Accordingly, characteristic differences between the pixels PXL1, PXL2, and PXL3 can be prevented or reduced within a range that minimizes the line load applied to the driving circuit (e.g., the first scan driver 100, the second scan driver 200, and/or the third scan driver 300). Thus, the image quality of the display device can be improved.

Additionally, according to the embodiments of the present disclosure, when some of the pixels (e.g., the second pixels PXL2) provided in an effective display region are coupled to current scan lines of some of the pixels (e.g., some of the first and third pixels PXL1 and PXL3) provided in the remaining region except the effective display region, some of the pixels provided in the remaining region are driven at the same MC CLK as the pixels of the effective display region during the period in which the display device is driven in the second mode. Accordingly, the initialization conditions of the pixels provided in the effective display region can be unformalized, and the image quality of the display device can be improved.

According to the present disclosure, the display device includes first and second pixel regions which are driven independently from each other, and supports a plurality of display modes. Accordingly, the utilization of the display device.

Further, according to the present disclosure, when the display device is driven in the second mode, a plurality of scan signals are supplied to pixels, e.g., second pixels in an effective display region during each frame period. Accordingly, the response speed of the second pixels can be improved.

Further, according to the present disclosure, when the display device is driven in the second mode, scan signals of which number is smaller than that of scan signals supplied to the second pixels are supplied to pixels provided in the remaining display region except the effective display region during each frame period. Accordingly, the occurrence of characteristic differences between the pixel regions can be prevented. In addition, the line load applied to the driving circuit can be minimized, and the time necessary for driving of the effective display region can be sufficiently secured.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims, and their equivalents.

What is claimed is:

1. A display device comprising:
a display region including first and second pixel regions, wherein the display device is configured to display an effective image in the first and second pixel regions, corresponding to a first mode, and display an effective image in the second pixel region, corresponding to a second mode;
a plurality of first pixels and a plurality of first scan lines in the first pixel region;
a plurality of second pixels and a plurality of second scan lines in the second pixel region;
a first scan driver comprising a plurality of first scan stages configured to drive at least some of the first scan lines; and
a second scan driver comprising a plurality of second scan stages configured to drive the second scan lines,
wherein the first scan driver is configured to supply p (p is a natural number) first scan signals to each of the at least some of the first scan lines during one frame period, corresponding to the second mode,
wherein the second scan driver is configured to supply q (q is a natural number greater than p) second scan signals to each of the second scan lines during the one frame period, corresponding to the second mode.

2. The display device of claim 1, wherein the first scan driver is configured to drive the at least some of the first scan lines during at least a partial period in the period in which the second scan lines are driven, corresponding to the second mode.

3. The display device of claim 1, wherein the first and second scan drivers are configured to sequentially supply r (r is a natural number smaller than q) scan signals to each of the first and second scan lines, corresponding to the first mode.

4. The display device of claim 1, further comprising a timing controller configured to supply first and second start signals respectively to the first and second scan drivers, corresponding to first and second modes.

5. The display device of claim 4, wherein the timing controller is configured to sequentially supply the first and second start signals respectively to the first and second scan drivers, corresponding to the first mode, and wherein, when the display device is driven in the first mode, the first and second start signals have the same width.

6. The display device of claim 4, wherein the timing controller is configured to supply the first and second start signals having different widths respectively to the first and second scan drivers, corresponding to the second mode, and
wherein, when the display device is driven in the second mode, the second start signal has a width wider by two horizontal periods (2H) or more than that of the first start signal.

7. The display device of claim 4, further comprising:
a third pixel region in the display region;
a plurality of third pixels and a plurality of third scan lines in the third pixel region; and
a third scan driver including a plurality of third scan stages configured to drive the third scan lines,
wherein the timing controller is configured to supply a third start signal having a width narrower by two horizontal periods (2H) or more than that of the second start signal, corresponding to the second mode.

8. The display device of claim 7, wherein the timing controller is configured to sequentially supply the first, second, and third start signals respectively to the first, second, and third scan drivers, corresponding to the first mode, and
wherein, when the display device is driven in the first mode, the first, second, and third start signals have the same width.

9. The display device of claim 7, wherein, when the display device is driven in the second mode, the first and third start signals are supplied during period different from one another in the period in which the second scan lines are driven, and have the same width.

10. The display device of claim 1, further comprising:
a third pixel region in the display region;
a plurality of third pixels and a plurality of third scan lines in the third pixel region; and
a third scan driver including a plurality of third scan stages configured to drive the third scan lines,
wherein the first and third scan drivers are configured to respectively drive the first and third scan lines during different partial periods in the period in which the second scan lines are driven, corresponding to the second mode.

11. The display device of claim 10, wherein the second pixel region is between the first pixel region and the third pixel region.

12. The display device of claim 11, wherein, when the display device is driven in the second mode,
the second scan driver is configured to sequentially drive the second scan lines during the one frame period,
the first scan driver is configured to sequentially drive the first scan lines during the period in which some second scan lines adjacent to the third pixel region among the second scan lines are driven, and
the third scan driver is configured to sequentially drive the third scan lines during the period in which other second scan lines adjacent to the first pixel region among the second scan lines are driven.

13. The display device of claim 11, wherein the first, second, and third scan drivers are configured to sequentially drive the respective first, second, and third scan lines, corresponding to the first mode.

14. The display device of claim 1, wherein second pixels on a first horizontal line of the second pixel region are coupled to any one scan line among the first scan lines.

15. The display device of claim 14, wherein the second scan driver further comprises a first scan stage configured to drive the one first scan line, and the second scan driver is configured to sequentially supply q first scan signals and the q second scan signals respectively to the one first scan line and the second scan lines by sequentially shifting a second start signal supplied to the first scan stage.

16. The display device of claim 1, wherein, when the display device is driven in the second mode, each of the first pixels emits light during a first time in the one frame period, and each of the second pixels emits light during a second time longer than the first time in the one frame period.

17. The display device of claim 1, further comprising:
a plurality of first emission control lines in the first pixel region;
a plurality of second emission control lines in the second pixel region;
a first emission control driver comprising a plurality of first emission control stages configured to drive the first emission control lines;
a second emission control driver comprising a plurality of second emission control stages configured to drive the second emission control lines; and
a timing controller configured to supply first and second emission start signals respectively to the first and second emission control drivers, corresponding to the first and second modes,
wherein, when the display device is driven in the first mode, the first and second emission start signals have the same width, and
wherein, when the display device is driven in the second mode, the first and second emission start signals have widths different from each other.

18. A display device comprising:
a display region comprising first and second pixel regions, wherein the display device is configured to display an effective image in the first and second pixel regions, corresponding to a first mode, and display an effective image in the second pixel region, corresponding to a second mode;
a plurality of first pixels and a plurality of first scan lines in the first pixel region;
a plurality of second pixels and a plurality of second scan lines in the second pixel region;
a first scan driver comprising a plurality of first scan stages configured to drive at least some of the first scan lines,
wherein the first scan driver is configured to supply p (p is a natural number) first scan signals to each of the at least some of the first scan lines during one frame period, corresponding to the second mode;
a second scan driver comprising a plurality of second scan stages configured to drive the second scan lines,
wherein the second scan driver is configured to supply q (q is a natural number greater than p) second scan signals to each of the second scan lines during the one frame period, corresponding to the second mode; and
a timing controller configured to supply first and second start signals respectively to the first and second scan drivers,
wherein, when the display device is driven in the second mode, a width of the second start signal is set wider than a width of the first start signal.

19. A method for driving a display device, the display device comprising a first pixel region having a plurality of first pixels and a second pixel region having a plurality of second pixels, the method comprising:
when the display device is driven in a first mode, displaying an effective image in the first and second pixel regions; and
when the display device is driven in a second mode, displaying an effective image in the second pixel region,
wherein, when the display device is driven in the first mode, a same number of scan signals are supplied to each of the first and second pixels during each frame period,
wherein, when the display device is driven in the second mode, q (q is a natural number of 2 or more) second scan signals are supplied to each of the second pixels during one frame period, and p (p is a natural number smaller than q) first scan signals are supplied to each of at least some of the first pixels during the one frame period.

20. The method of claim 19, wherein, when the display device is driven in the first mode, each of the first and second pixels is controlled to have the same emission time, and
wherein, when the display device is driven in the second mode, each of the first pixels is controlled to have an emission time shorter than that of each of the second pixels.

* * * * *